(12) United States Patent
Odaibo

(10) Patent No.: US 12,450,409 B1
(45) Date of Patent: Oct. 21, 2025

(54) CAM-GUIDED TRANSFORMERS FOR AI-BASED PROTEIN AND DRUG DESIGN

(71) Applicant: Stephen Gbejule Odaibo, Sugar Land, TX (US)

(72) Inventor: Stephen Gbejule Odaibo, Sugar Land, TX (US)

(73) Assignee: Deep EigenMatics LLC, Sugar Land, TX (US)

( * ) Notice: Subject to any disclaimer, the term of this patent is extended or adjusted under 35 U.S.C. 154(b) by 0 days.

(21) Appl. No.: 19/087,449

(22) Filed: Mar. 22, 2025

(51) Int. Cl.
- *G06F 30/27* (2020.01)
- *G06N 3/0455* (2023.01)
- *G16B 15/30* (2019.01)
- *G16B 40/20* (2019.01)

(52) U.S. Cl.
CPC .......... *G06F 30/27* (2020.01); *G06N 3/0455* (2023.01); *G16B 15/30* (2019.02); *G16B 40/20* (2019.02)

(58) Field of Classification Search
CPC ...... G06F 30/27; G06N 3/0455; G16B 15/30; G16B 40/20
See application file for complete search history.

(56) References Cited

PUBLICATIONS

Pu, Limeng, et al. "DeepDrug3D: Classification of ligand-binding pockets in proteins with a convolutional neural network." PLoS computational biology 15.2 (Year: 2019).*
Chen, Jiaxiao, et al. "QuoteTarget: A sequence-based transformer protein language model to identify potentially druggable protein targets." Protein Science 32.2 (Year: 2023).*
Sharma, Komal, et al. "Peptide-based drug discovery: Current status and recent advances." Drug Discovery Today 28.2 (Year: 2023).*

* cited by examiner

*Primary Examiner* — Soren Harward
*Assistant Examiner* — Dawn Bickham

(57) ABSTRACT

Systems, methods, and apparatus for peptide ligand and small molecule dug design given target protein sequence and structure are presented. The methods use class activation mapping (CAM)-guided transformers to generate the ligand. Given a target protein structure, a CAM-guided structure refinement process is used to optimize the structure towards the desired ligand effect classification. The embedding of the target protein's refined structure along with its residue embeddings are the input array into a transformer architecture.

15 Claims, 16 Drawing Sheets

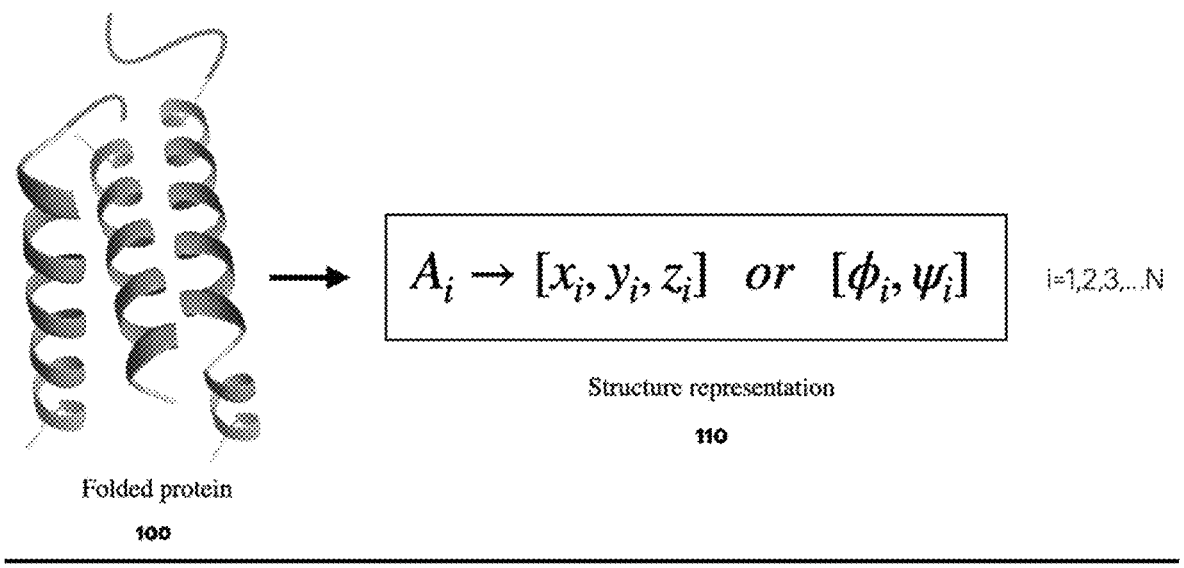
FIG. 1 Protein Structure Representation.

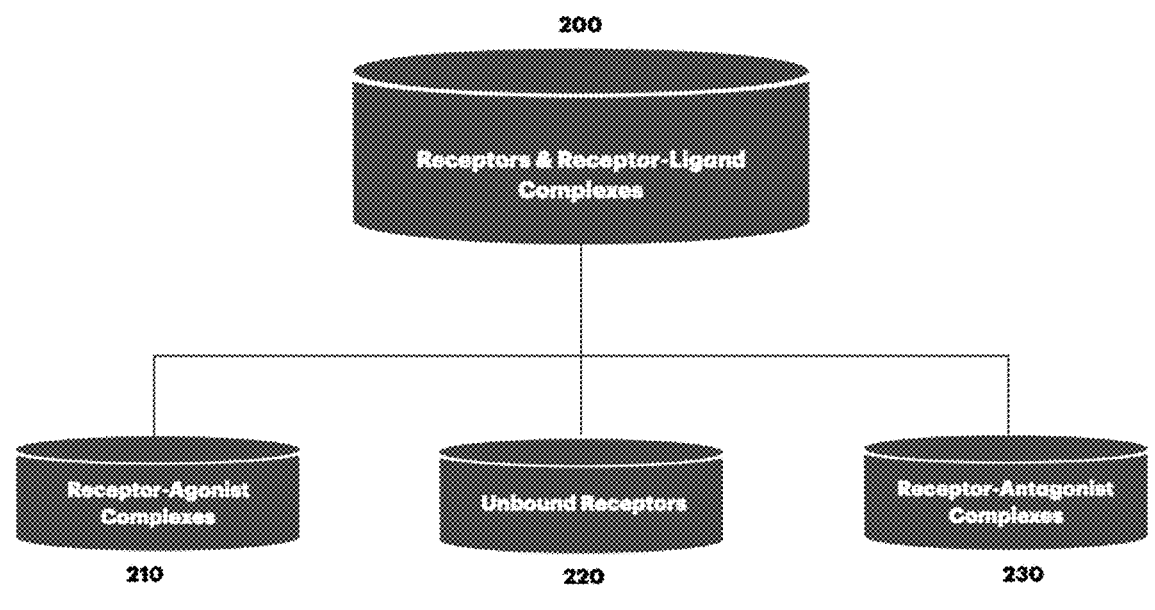
FIG. 2 An Illustrative Example of a Signaling Pathway Specific Database

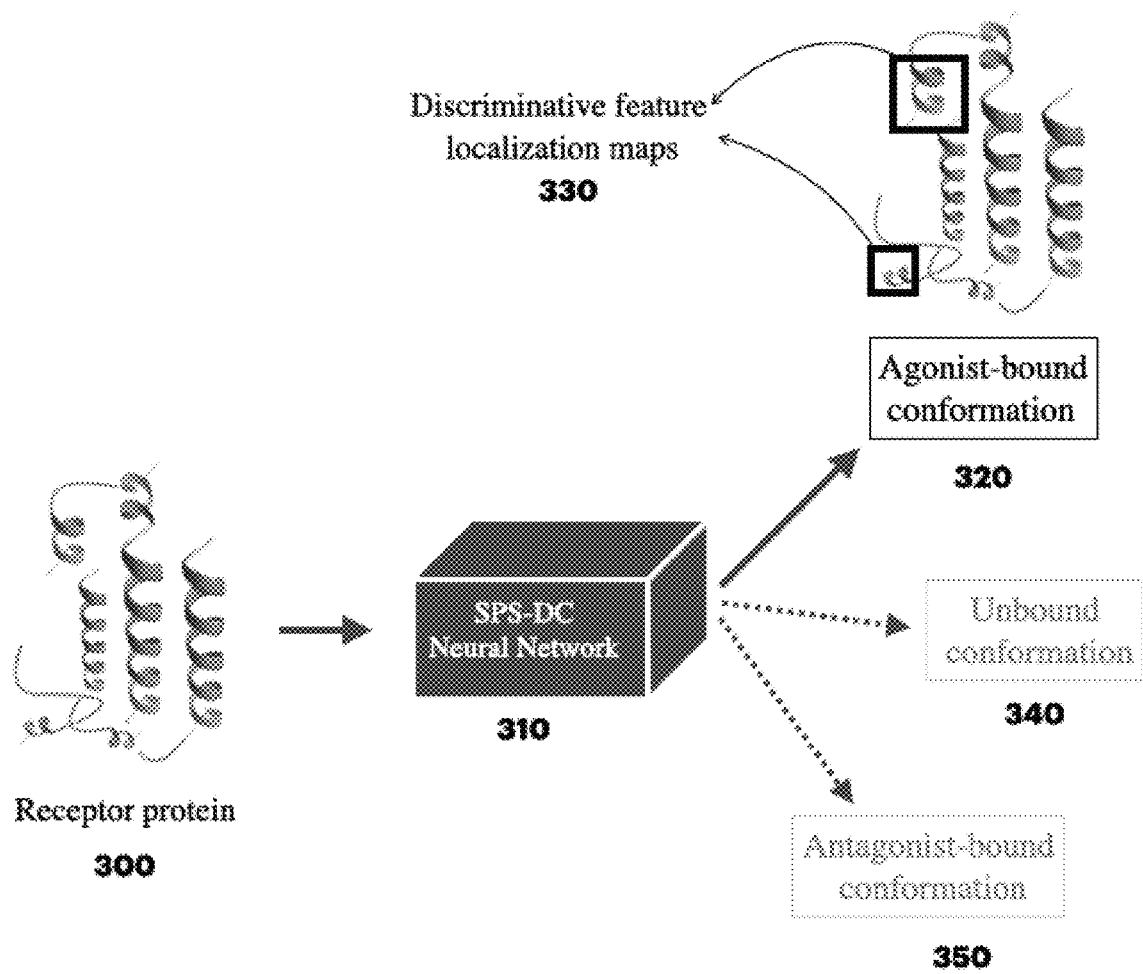
FIG. 3 Illustration of a Signaling Pathway Specific Discriminative Classifier (SPS-DC) Neural Network Classification of a Target Protein (Receptor) as being in an Agonist-Bound Conformation with respect to the SPS-DC's Specific Signaling Pathway.

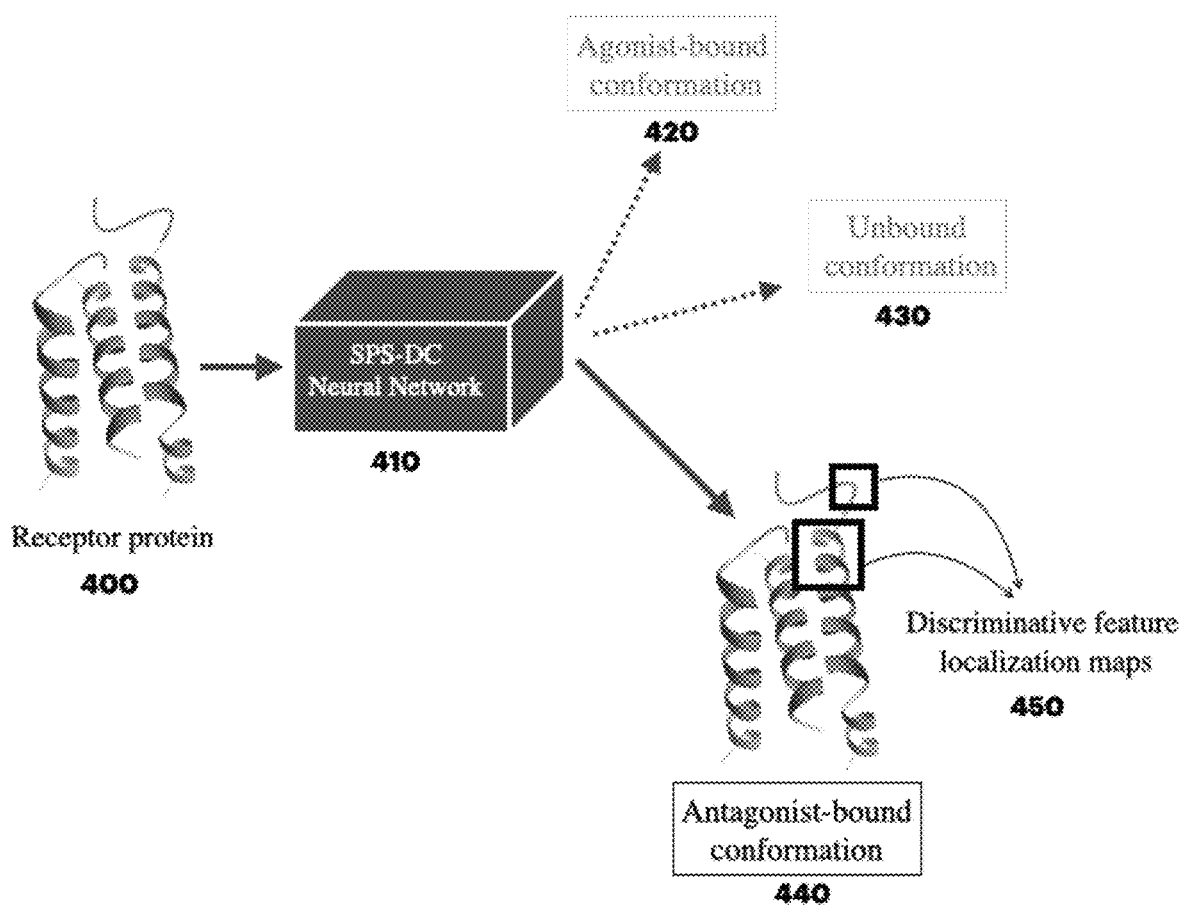
FIG. 4 Illustration of a Signaling Pathway Specific Discriminative Classifier (SPS-DC) Neural Network Classification of a Target Protein (Receptor) as being in an Antagonist-bound Conformation with Respect to the SPS-DC's Specific Signaling Pathway.

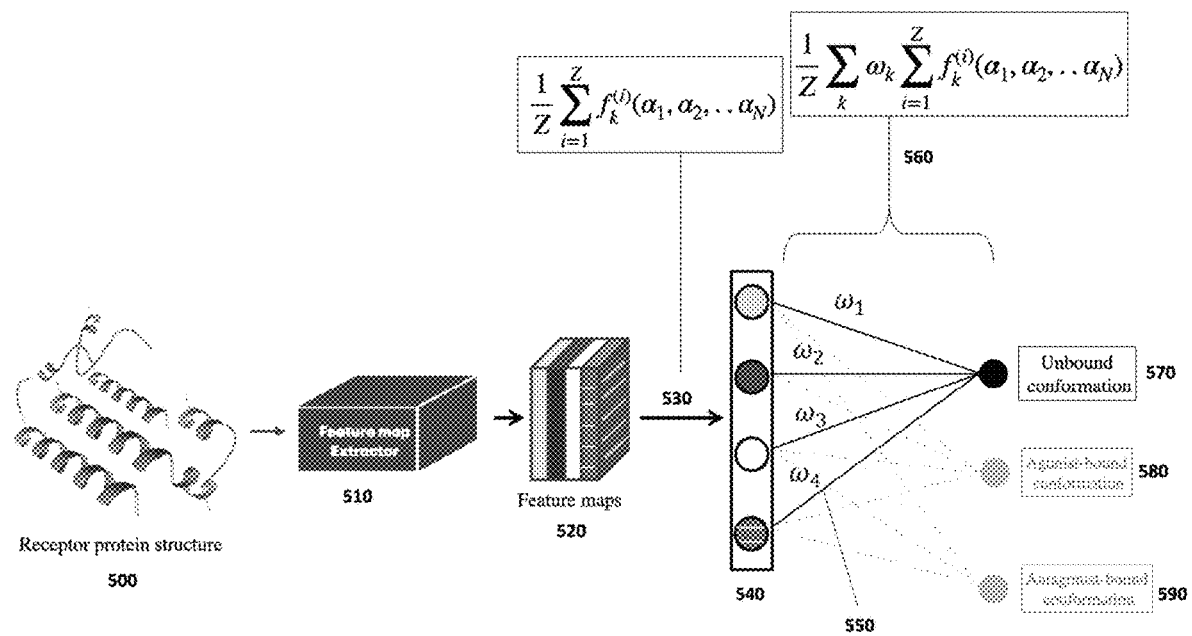
FIG. 5 Class Activation Map. Illustrative Instance of Unbound Conformation Classification of Receptor Protein.

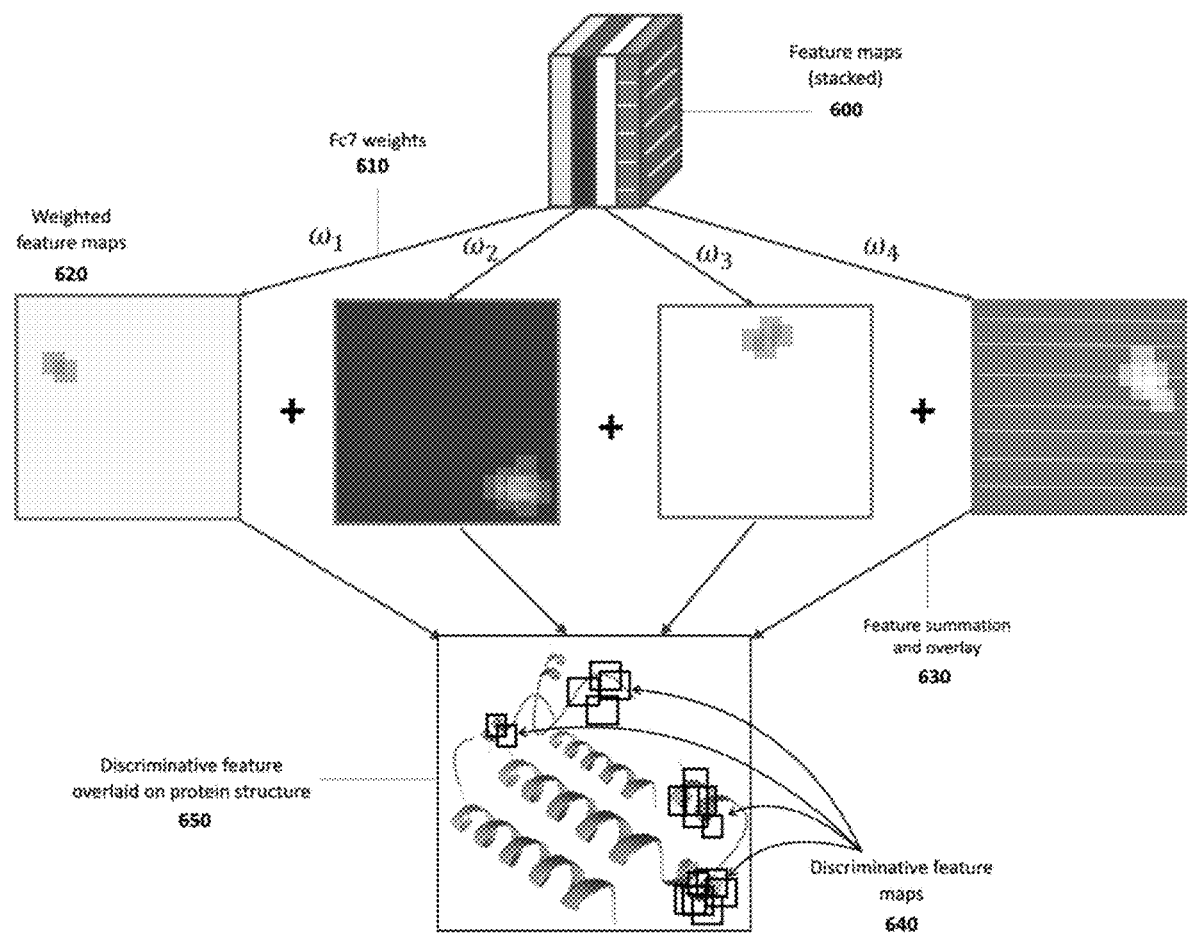
FIG. 6 Illustrative Example of Class Activation Mapping Mechanism.

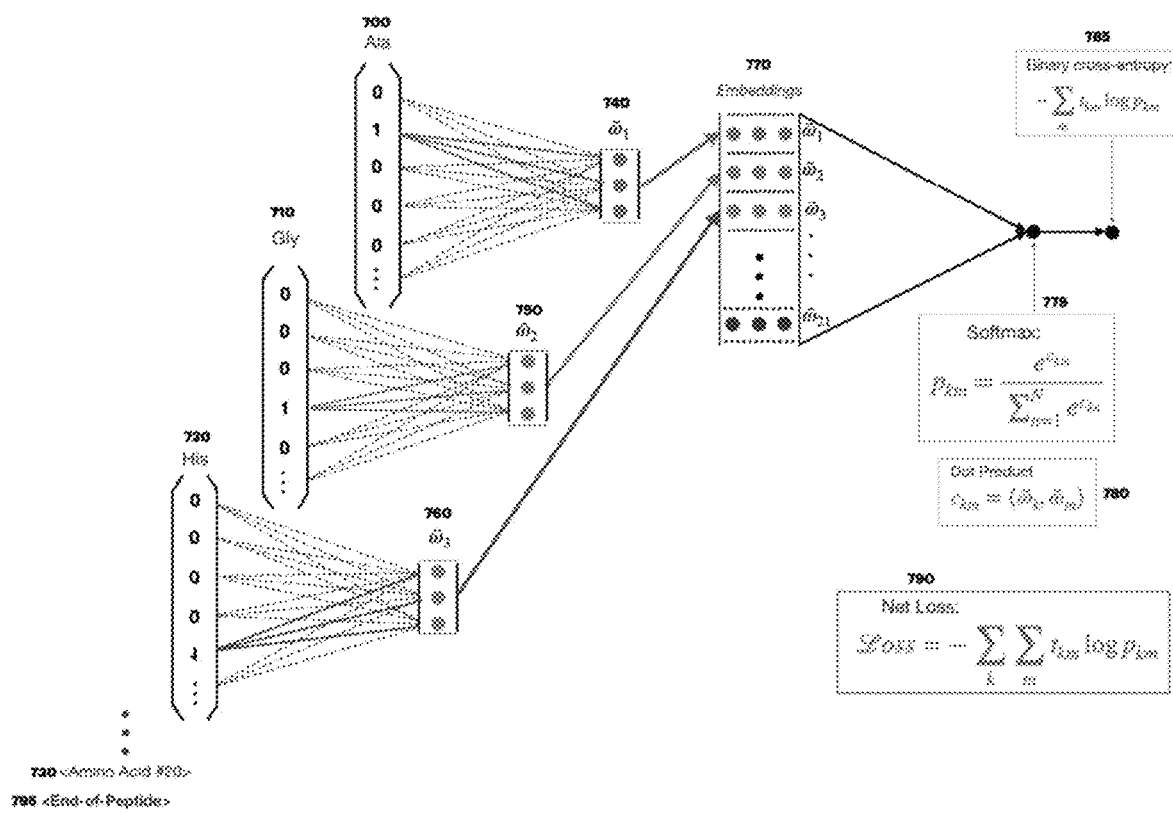
FIG. 7 Illustration of an Amino Acid Embedding.

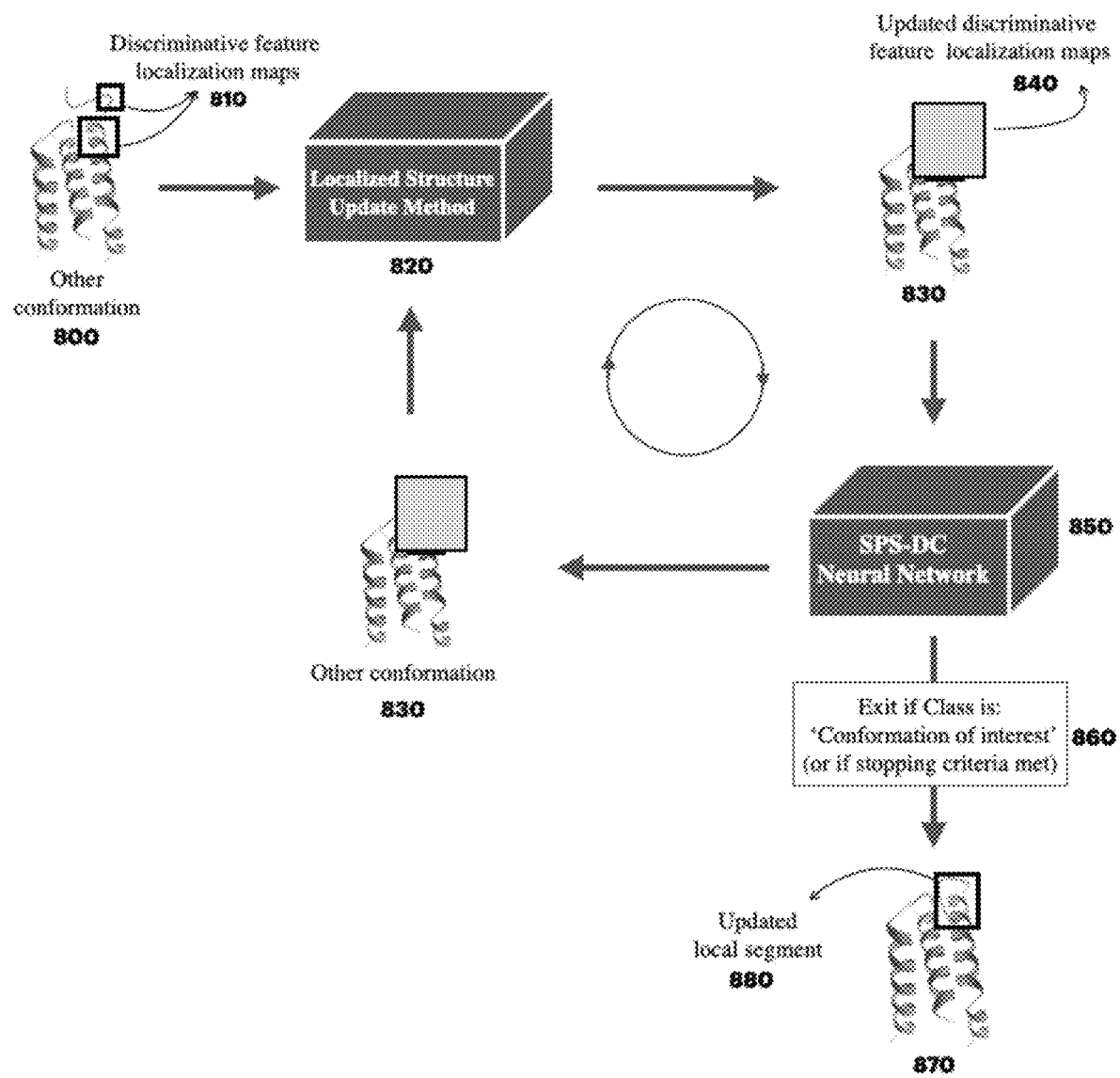
FIG. 8 An Example of a CAM-Localized Structure Update Engine.

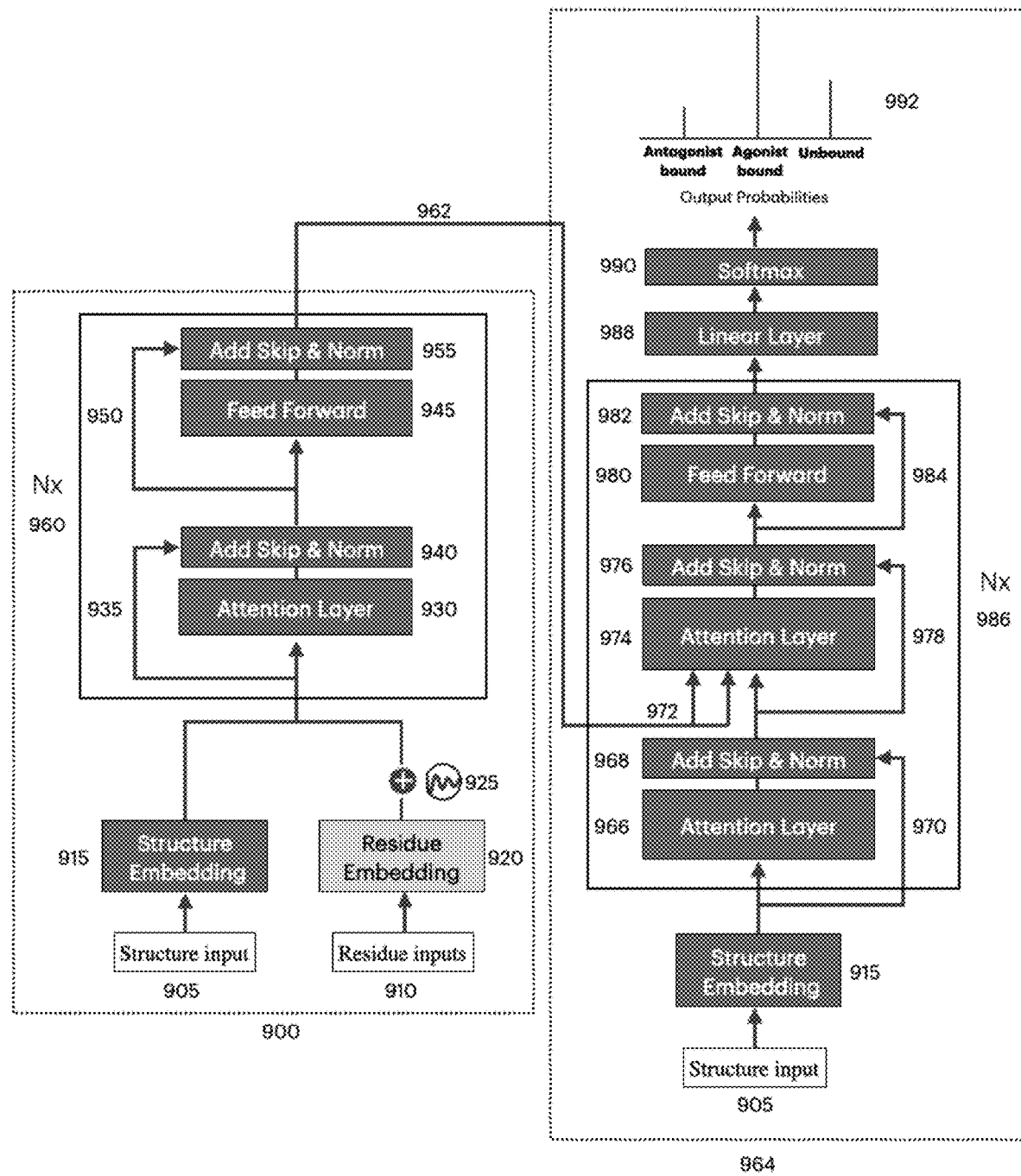
FIG. 9 A Transformer Architecture-Based Signaling Pathway Specific Discriminative Classifier (SPS-DC) Neural Network.

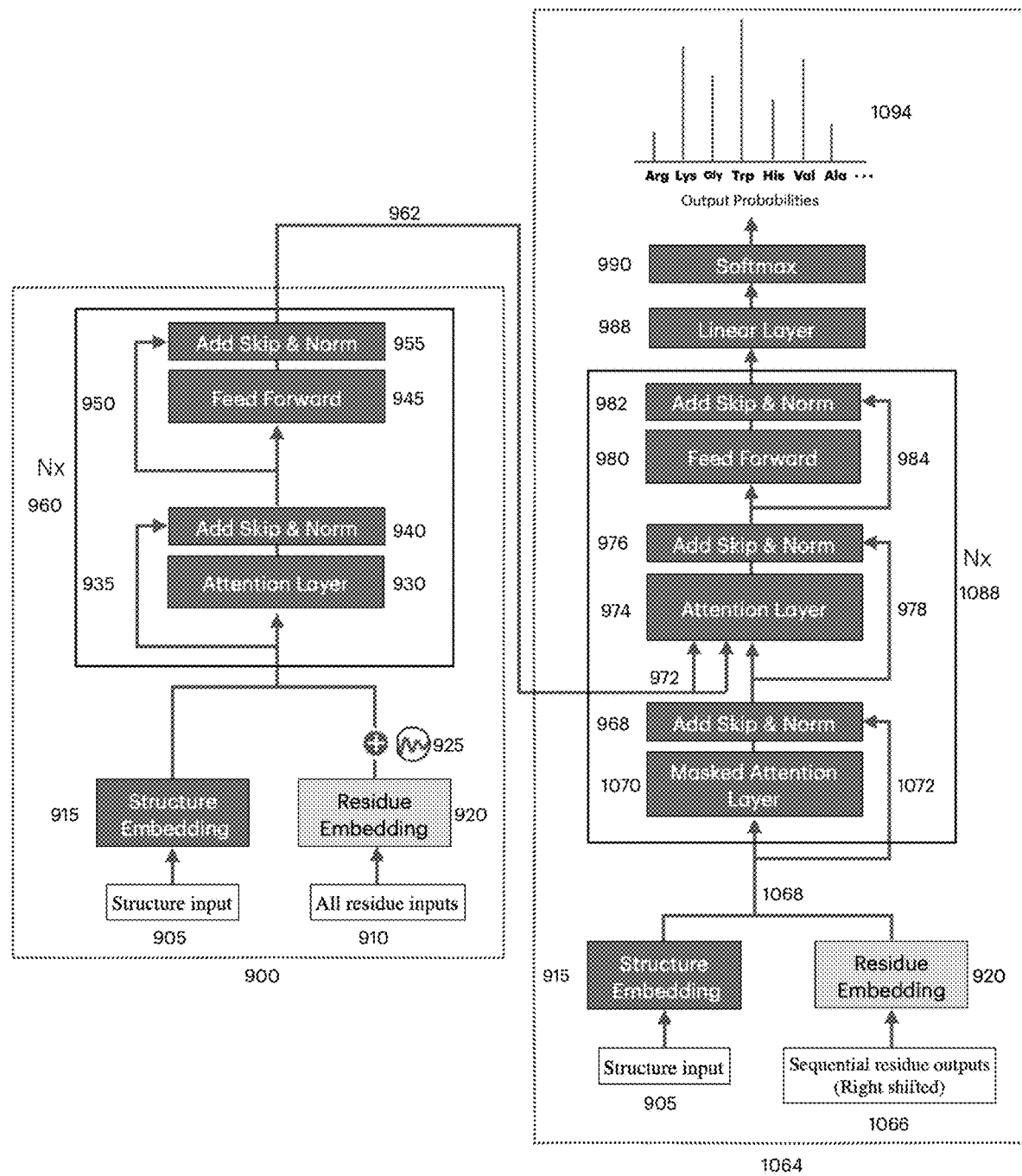
FIG. 10 An Illustrative Example of a Training Architecture of a CAM-Guided Transformer Expert for Peptide Ligand Design Given Target Protein Sequence and Structure.

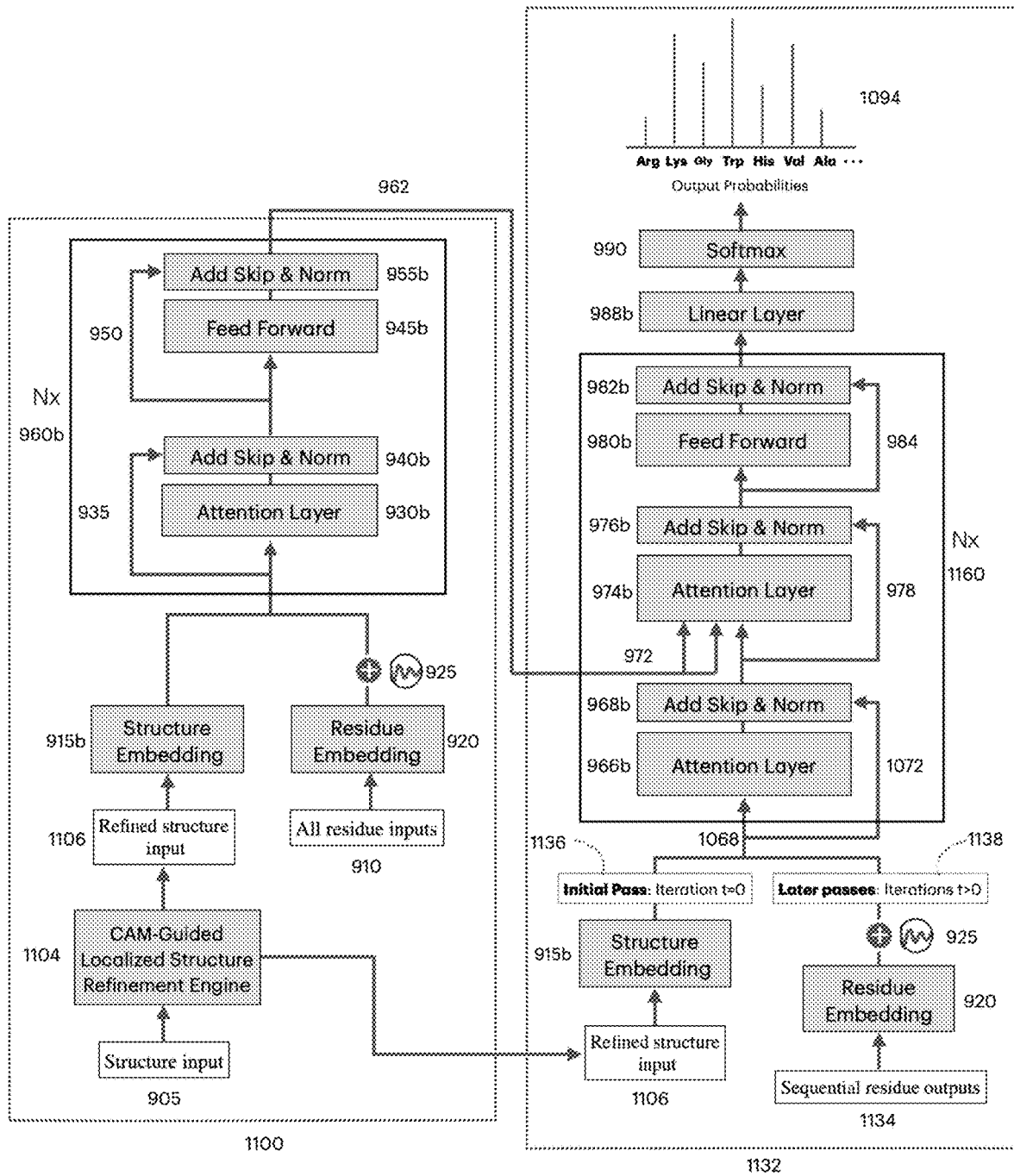
FIG. 11 An Illustrative Example of an Inference Architecture of a CAM-Guided Transformer Expert for Peptide Ligand Design Given Target Protein Sequence and Structure.

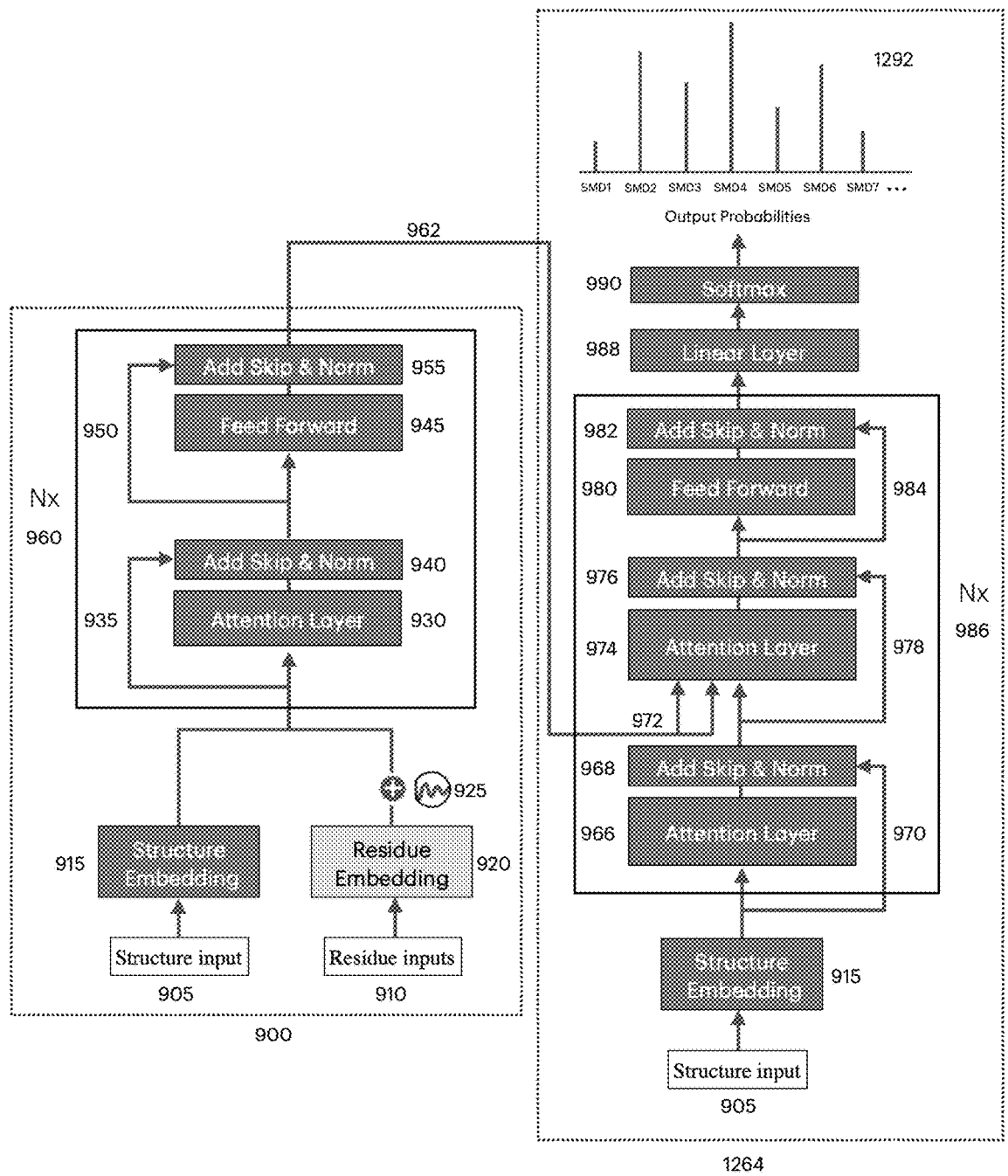
FIG. 12 An Illustrative Example of a Training Architecture of a CAM-Guided Transformer Expert for Small Molecule Drug Ligand Design Given Target Protein Sequence and Structure.

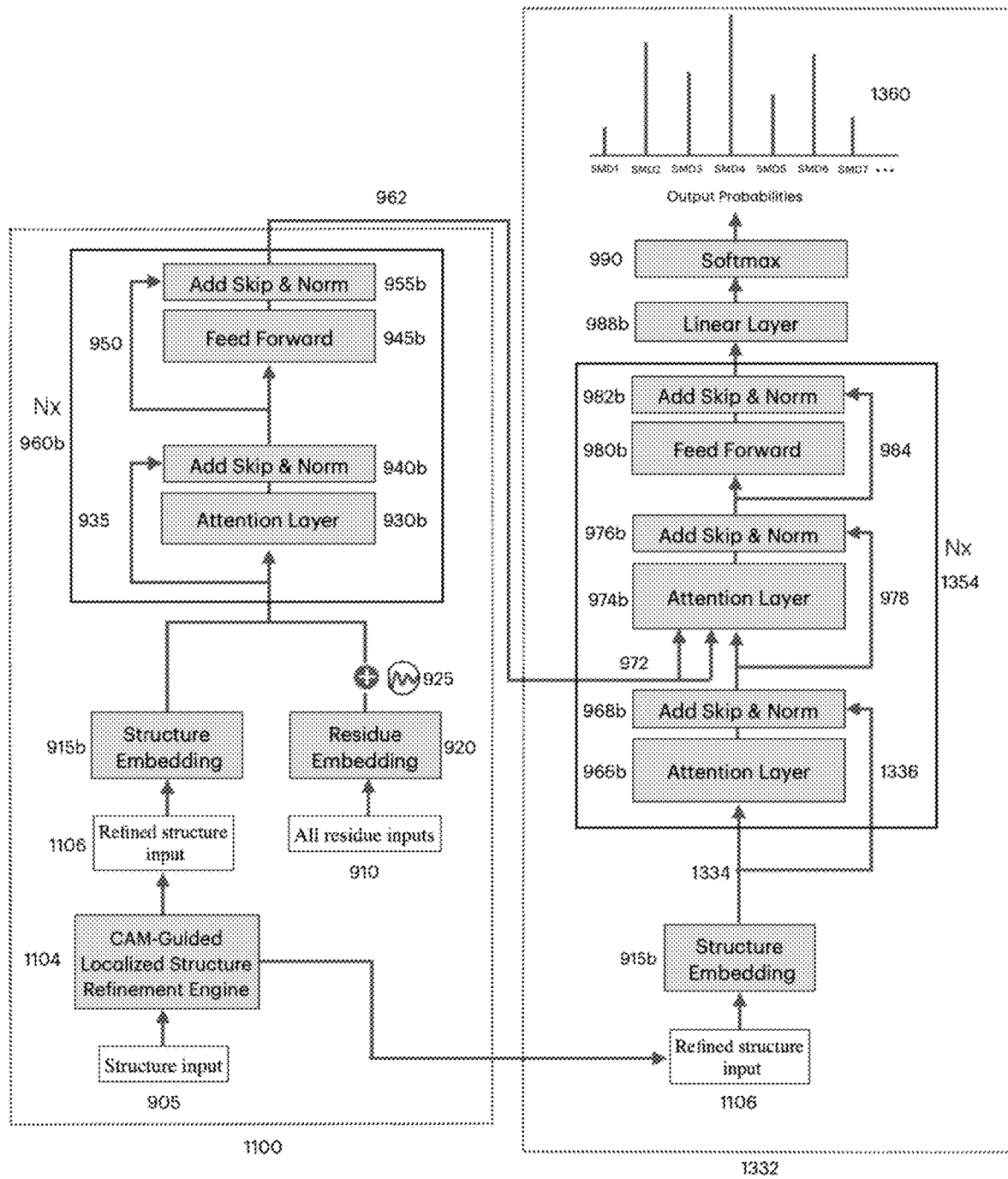
FIG. 13 An Illustrative Example of an Inference Architecture of a CAM-Guided Transformer Expert for Small Molecule Drug Ligand Design Given Target Protein Sequence and Structure.

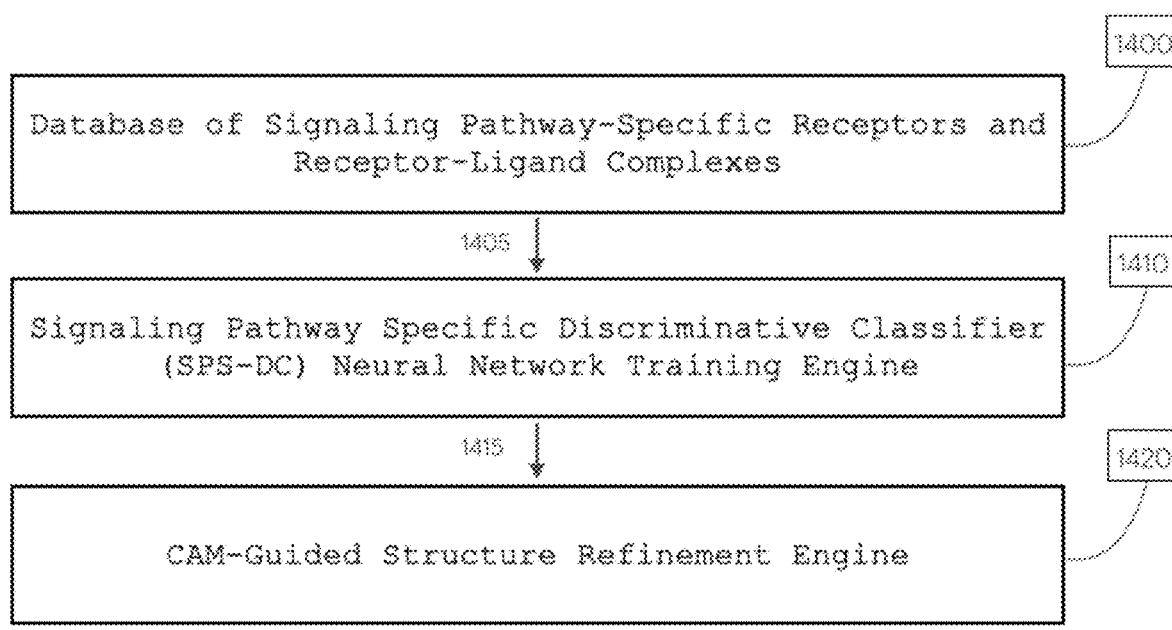
FIG. 14 Flow Schematic of Steps to an Embodiment of a CAM-Guided Structure Refinement Engine.

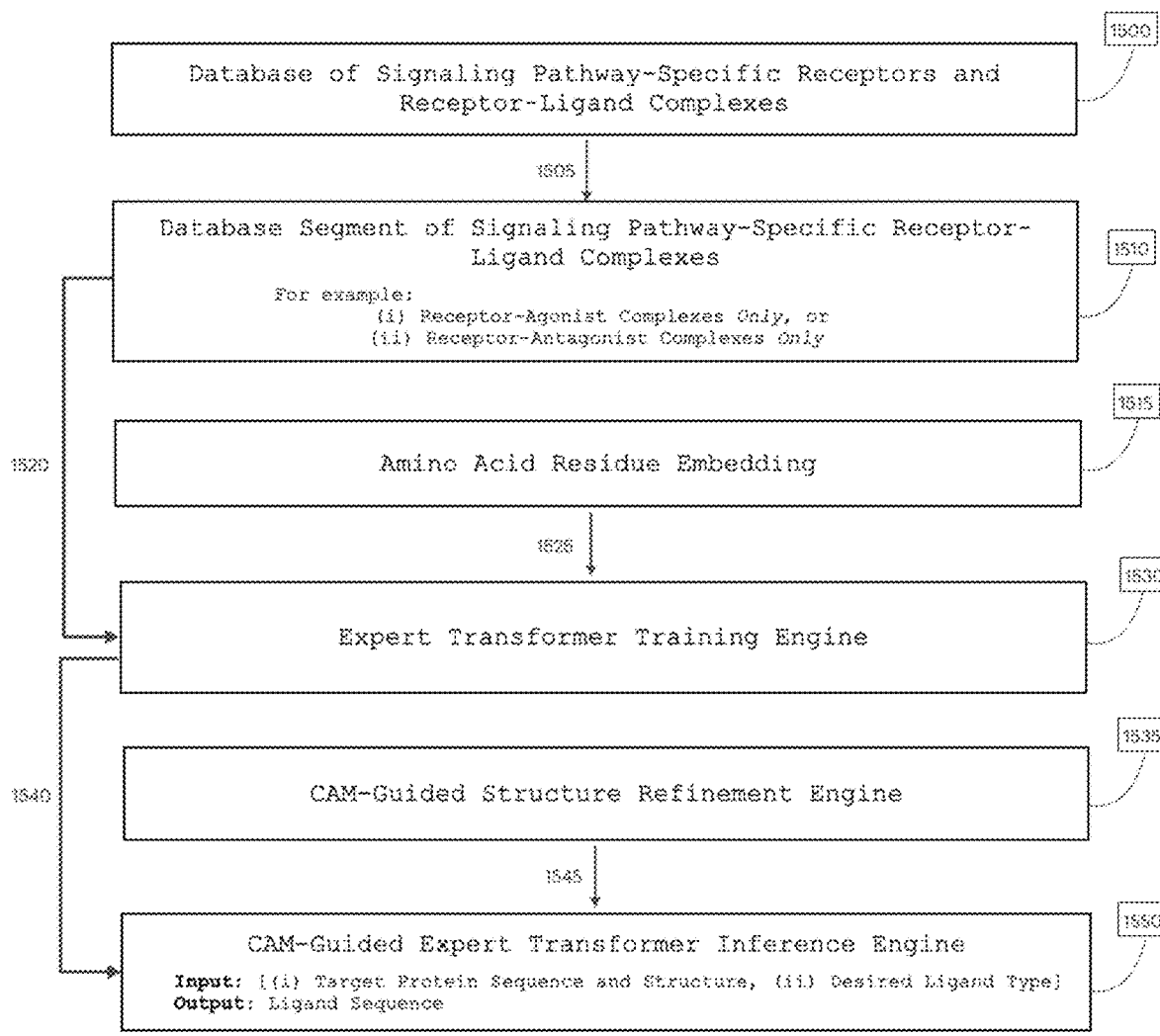
FIG. 15 Flow Schematic of Steps to an Embodiment of a CAM-Guided Expert Transformer Inference Engine.

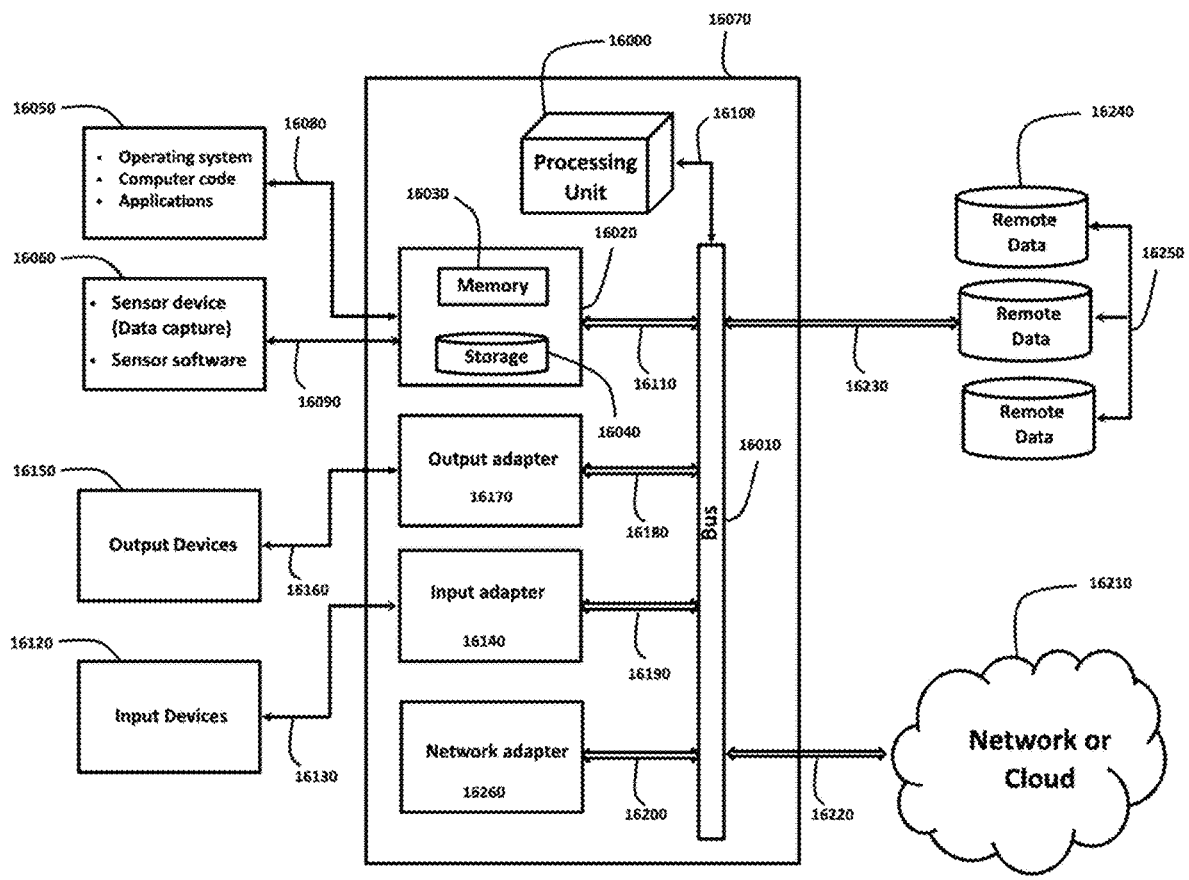
FIG. 16 Computing Environment

CAM-GUIDED TRANSFORMERS FOR AI-BASED PROTEIN AND DRUG DESIGN

FIELD OF THE INVENTION

The present invention relates generally to Artificial Intelligence (AI) and Machine Learning (ML) methods for protein and drug ligand design and structure determination, and specifically to discriminative feature localization guided transformer architectures for protein and drug design.

BACKGROUND OF THE INVENTION

The research and development pipeline for new drugs is tremendously expensive and lengthy, often costing over $2 billion and more than 10 years to get a single candidate drug through clinical testing phases. Yet despite the exorbitant investment of time and resources, a high percentage of drugs fail in the clinical testing phases. One important reason for the high failure rate is that current approaches to drug discovery and development do not properly account for the high specificity of receptor conformational states that drive cellular function.

In particular, ligands of target proteins induce conformational changes associated with a variety of categories of effect.

In the case of receptors for instance, ligand effects are agonism and ligands may be agonists, antagonists, inverse agonists, partial agonists or antagonists, biased agonists, or biased antagonists amongst other categories. These agonism categories are only meaningful with respect to highly specified downstream signaling or substrate effects.

However, within drug discovery and development, current categorization approach has generally not properly recognized or addressed the high specificity of ligand effects. For instance, terms such as 'agonist' or 'antagonist' are used and implemented within the drug discovery process without specifying the particular downstream signaling mechanisms or substrates with respect to which the agonism effect is observed. Of note, a given ligand may be an agonist with respect to one signaling pathway, but an antagonist with respect to another. Similarly, a given ligand may induce opposite effects on two different but similar receptors. For instance, angiotensin II induces opposite effects on the angiotensin II type 1 receptor (AT1R) than it does on the angiotensin II type 2 receptor (AT2R). These critical points highlighting the high structural specificity of target-protein mediated cell signaling are often either ignored or not recognized in prevailing literature and drug development paradigms.

This neglect or non-recognition of how exquisitely receptor structure conformations impact specific downstream effects plays a significant role in the high failure rate of drug development. As such, there is a greatly unmet need for computational approaches to protein and drug design that properly recognize and leverage the highly specific nature of receptor-mediated cell signaling.

In the invention disclosed herein, we address this important unmet need by introducing methods, systems, and apparatus for discriminative feature localization-guided transformers for protein and drug design.

The transformer architecture was introduced in its current general form in 2017 (Vaswani et al) for the neural machine translation problem. One of its core aspects is the attention mechanism for wherein using learnable key, query, value embeddings the neural network learns which tokens to pay attention to during the translation of any given token in the sequence.

There have been a number of efforts using transformers for the protein design problem. However, prior to the disclosure of this invention, there have been no Class Activation Map (CAM)-guided transformers for protein and drug design. Furthermore, there have been no discriminative feature localization guided transformer architectures for protein and drug design.

The invention disclosed herein is the first CAM-guided transformer architecture, it is the first CAM-guided transformer architecture for protein and drug design, and it addresses a significant unmet need for more specific computational methods and apparatus for drug discovery and development.

The methods, systems, and apparatus disclosed in this invention increase the likelihood of yielding novel drugs and therapies that effectively treat diseases.

OBJECTS OF THE INVENTION

It is an object of this invention to provide a system, method, and apparatus for obtaining and synthesizing an effective peptide ligand given a target protein sequence and structure, wherein the peptide ligand is of a specified effect category; and wherein the system, method, and apparatus accounts for the high structural specificity of target protein-driven cellular signaling.

Another object of this invention is to provide a system, method, and apparatus for obtaining and manufacturing an effective small molecule drug ligand, given a target protein sequence and structure, wherein the small molecule drug ligand is of a specified effect category; and wherein the system, method, and apparatus accounts for the high structural specificity of target protein-driven cellular signaling.

Yet other objects, advantages, and applications of the invention will be apparent from the specifications and drawings included herein.

SUMMARY OF THE INVENTION

The invention disclosed herein includes a method comprising preparing or accessing a database of target protein-ligand complexes (or target proteins and corresponding ligands in complex state conformations), wherein the database is segmented or indexed in a signaling pathway-specific manner. By database we mean a diverse plurality of target protein-ligand complexes or a diverse plurality of target proteins and corresponding ligands in complex state conformations.

For instance, by way of example and not limitation, such a database may include the G-protein Coupled Receptor (GPCR), Angiotensing II Type 1 receptor (AT1R) in complex with the peptide ligand, angiotensin II. The corresponding effect label (or index) of the complex would be 'agonist,' and the associated signaling pathway based on which angiotensin is an agonist must be specified. In this case, it is a $G_{q/11}$ and $G_{i/o}$ mediated pathway.

The signaling pathway specific database of target protein-ligand complexes is used to train a Signaling Pathway Specific Discriminative Classifier (SPS-DC) neural network. The SPS-DC neural network is configured to accept target protein sequence and structure as input, and as output it yields a classification into a ligand effect category.

The term "category" in "ligand effect category" as used in the specifications and in the claims are a specified partitioning of the plurality of representations of target protein-ligand complexes; wherein each such partition represents a class in the associated signaling pathway specific dataset; and wherein each such partition represents an output class label of the associated signaling pathway specific discriminative classifier (SPS-DC) neural network.

By way of example but not limitation, the ligand effect category could be agonist-bound conformation, unbound conformation, or antagonist-bound conformation. Alternatively, it could be an associated downstream signaling biomarker such as a second messenger signal.

Furthermore, the SPS-DC neural network is equipped with a discriminative feature localization mechanism whereby it outputs a feature map specifying the discriminative features of the target protein. For example, if a given target protein is classified as agonist-bound at inference time, the discriminative feature localization mechanism will indicate which features of the target protein caused the SPS-Dc neural network to classify it as agonist-bound.

The discriminative feature localization mechanism can be any method that enables localization of the particular features in the target protein sequence and structure representation that decided the class. By way of example and not limitation, discriminative feature localization methods include Class Activation Mapping (CAM) and CAM-variants. As used in this description, the term CAM-variant means any method that uses a decomposition of the neural network's feature extraction, weighted scalings, and activations to determine the discriminative feature map. Examples of CAM-variants include but are by no means limited to Gradient-weighted Class Activation Mapping (Grad-CAM), Guided Grad-CAM, Guided Backpropagation, Integrated Gradients, Eigen-CAM, Self-Matching CAM, Grad-CAM++, Smooth Grad-CAM++, Score CAM, Ablation-CAM, Layer-wise Relevance Propagation (LRP), and Shap-CAM.

Another type of method of discriminative feature localization is occlusion sensitivity analysis.

In one embodiment of the invention, the discriminative feature localization method is a Class Activation Map (CAM). These may use a Global Average Pooling (GAP) step following a series of feature extraction steps. In particular, given a target protein representation as input, the SPS-DC layers serve as feature extractors yielding a set of feature maps. Each feature map can be condensed into a single scalar via a global average pooling operation, for instance. Together, the set of feature maps therefore becomes a feature vector after the GAP operation. The feature vector may be connected via a densely connected ("Fc7") layer to an output node activated by a Rectified Linear Unit (ReLU) or similar activation function. This output in turn can be passed into a softmax activation so as to generate a probability distribution as the final output. Since the ReLU family of activations are monotonically increasing over positive input domain and zero otherwise, it follows that classification into a given class occurs when scaled inputs from the feature vector are positive. This in turn occurs when the scaled feature maps are positive and higher than those of the non-selected class. The scaled feature maps can be upsampled and overlaid on the input target protein structure representation to identify the aspects of the structural parameters and sequence that determined the classification.

Upon identifying the discriminative features, the next step is to pass the target protein's structure representation and associated discriminative feature map as input into a Localized Structure Update Engine. This yields an updated protein structure. In one embodiment, only the discriminative feature maps are changed from the input structure. Furthermore, at convergence, the updated structure is optimized towards the desired ligand effect class.

The Localized Structure Update Engine consists of the SPS-DC neural network as well as a localized structure update method. The localized structure update method could be any number of methods including but not limited to genetic algorithms and variants, particle swarm optimization methods and variants, simulated annealing and variants, and stochastic gradient descent and variants. As noted, in some embodiments it could be a genetic algorithm whereby the SPS-DC evaluates and checkpoints the ligand effect classification following a certain number of iterations. A similar checkpointing forward-facing approach can be applied to particle swarms with the trained SPS-DC as value function. Additionally, as noted, stochastic gradient descent (SGD) may also be utilized.

The signaling pathway-specific database of target protein-ligand complexes is further segmented by ligand effect class. For instance, one segment would contain only receptor-agonist complexes, another segment would contain only receptor-antagonist complexes, and so on.

The segmented database is then used to train an expert transformer. It is expert in the sense that each such transformer is specialized in the ligand effect segment category of its training dataset. For example, one expert transformer's expertise would be in the design of agonist peptide ligands, another expert transformer's expertise would be in the design of antagonist peptide ligands, and so on; wherein the respective training datasets are of receptor-agonist complexes, receptor-antagonist complexes, and so on.

At inference time, each expert transformer neural network is equipped with a CAM-guided structure refinement engine, each of which contains a trained SPS-DC neural network as a main component.

At inference time, the structure input (a vector of structure parameters) is first refined by the CAM-guided structure refinement engine according to the requisite ligand effect classification. The refined structure input is then passed into a structure embedding to yield a structure embedding vector. The weights of the structure embedding are learnable parameters of the transformer neural network.

The structure input is a vector of structure parameters. In one embodiment, the structure input is of fixed length, wherein for proteins of sequence length below the structure input length, the unfilled entries are padded with zeros. The structure input fixed length is a hyperparameter of the system. Factors that determine the choice include the distribution of sequence lengths of proteins in the human body or of known industrial enzymes. The largest known cell surface receptor in the human body for instance is Very Large G-protein Coupled Receptor 1b (VLGPCR1b) with 6307 amino acids. For example, in some embodiments specifically for designing ligands for human cell surface receptor target proteins, one may set a structure input length upper bound of around n*6307, where n is the number of structure parameters per residue in the chosen structure representation.

In the invention disclosed herein, the transformer architecture residue embeddings are a separately trained neural network. The trained residue embedding is then plugged into the transformer architecture both during training and inference of the transformer. The residue embedding weights, however, are not learnable parameters of the transformer.

In one embodiment of the invention, the residue embedding is trained using a loss function that enforces the following: inner products of embeddings of amino acid residues that are generally further apart should be closer to zero, while inner products of embeddings of amino acid residues that are generally close to each other should be close to 1. The general proximity of amino acid residues to each other is inferred from the plurality of proteins in the residue embedding training database.

In the invention disclosed herein, there is a difference in the handling of ligand peptide design and the handling of small molecule drug ligand design. For the task of peptide ligand design, i.e. the task of obtaining a peptide ligand sequence for a given target protein, an autoregressive procedure is used during training and inference. However, for the task of small molecule drug ligand design, the output is taken as being of sequence length one, hence autoregression is not used.

In summary, the invention disclosed herein consists of systems, methods, and apparatus using CAM-guided transformers to obtain and synthesize an effective peptide ligand or small molecule drug ligand for a given target protein, wherein the target protein sequence and structure is given, and wherein the effect category of the peptide ligand or small molecule drug is specified, and wherein the high structural specificity of target protein-driven cellular signaling is properly accounted for.

The invention consists of several outlined processes below, and their relation to each other, as well as all modifications which leave the spirit of the invention invariant. The scope of the invention is outlined in the claims section.

BRIEF DESCRIPTION OF THE DRAWINGS

In the following detailed description of the invention, we reference the herein listed drawings and their associated descriptions, in which:

FIG. 1 is an example of a protein structure representation;

FIG. 2 is an illustrative example of a signaling pathway specific database;

FIG. 3 is an illustrative example of a signaling pathway specific discriminative classifier (SPS-DC) neural network classification as being in an agonist-bound conformation.

FIG. 4 is an illustrative example of a signaling pathway specific discriminative classifier (SPS-DC) neural network classification as being in an antagonist-bound conformation.

FIG. 5 is an illustrative example of a Class Activation Map (CAM) in an SPS-DC neural network classifying a target protein as being in an unbound conformation.

FIG. 6 is a schematic illustration of an example of a CAM mechanism showing discriminative feature map summation.

FIG. 7 is a schematic illustration of an example of an amino acid embedding neural network training procedure.

FIG. 8 is a schematic illustration of an example of a CAM-guided structure update engine.

FIG. 9 is an illustrative example of a transformer architecture-based signaling pathway specific discriminative classifier (SPS-DC) neural network.

FIG. 10 is an illustrative example of a training architecture of a CAM-guided transformer expert for peptide ligand design given target protein sequence and structure.

FIG. 11 is an illustrative example of an inference architecture of a CAM-guided transformer expert for peptide ligand design given target protein sequence and structure.

FIG. 12 is an illustrative example of a training architecture of a CAM-guided transformer expert for small molecule drug ligand design given target protein sequence and structure.

FIG. 13 is an illustrative example of an inference architecture of a CAM-guided transformer expert for small molecule drug ligand design given target protein sequence and structure.

FIG. 14 is a flow schematic of steps for one embodiment of a CAM-Guided structure refinement engine.

FIG. 15 is a flow schematic of steps for one embodiment of a CAM-Guided expert transformer inference engine.

FIG. 16 is an example of a computing environment.

DETAILED DESCRIPTION OF THE PREFERRED EMBODIMENTS

The illustration in FIG. 1 is a preferred embodiment of a protein structure representation. The folded protein 100 can be represented as shown 110 such that for each amino acid, the spatial [x,y,z] coordinates of representative atoms in each amino acid backbone may be chosen. Alternatively, a pairwise distance map may be used to represent the protein structure; such that the distance map is itself represented as a matrix (D) of size $N^2$ where N is the number of amino acids constituting the protein; wherein the (i, j)th entry of the D matrix represents the distance between representative atoms of the ith and jth amino acids.

Another method of representing the protein structure is via torsion angles, ($\phi$, $\varphi$), between the amino acids of the protein.

Furthermore, the structure representations can be probabilistic, whereby for instance the distance between any two amino acids is represented as a gaussian centered about the mean and of a specified variance. Similarly for torsion angle representation, whereby the angles are taken as the means of a gaussian, for instance. Any other appropriate representation adequately capturing the structure of the protein can be utilized.

FIG. 2 illustrates a signaling pathway specific database 200 wherein the target proteins are receptors. The database can be organized in any number of ways indexed by ligand effect categories, and by specific signaling pathway. This enables database segmentation utilized for training of expert transformers further described below. In this illustrative example, one segment of the database is of receptor-agonist complexes 210, another of unbound receptors 220, and another of receptor-antagonist complexes 230.

The exemplary illustration in FIG. 3 depicts a receptor protein structure representation 300 passed as input into an SPS-DC neural network 310 which classifies the input receptor protein structure as being of the agonist-bound conformation 320. Furthermore, the SPS-DC localizes the discriminative feature maps 330. The unbound conformation 340 and antagonist-bound conformation 350 are also shown. The SPS-DC neural network 310 may be a graphical neural network, a graphical convolutional neural network, a convolutional neural network, a recurrent neural network, a transformer-based network architecture as illustrated in FIG. 9 below, or it may be any other neural network configuration or architecture that enables representation of target proteins in a space where meaningful ligand effect classification can be conducted.

Training of the SPS-DC neural network 310 relies on a database of target protein-ligand complexes such as that illustrated in 200 depicted in FIG. 2. The database includes multi-dimensional indexing across associated attributes including but not limited to signaling pathway specifiers and ligand effect category. In particular, each of the possible values of each categorization random variable should be represented in a statistically representative manner in the database. For instance, as depicted in FIG. 3, consider a simple example of a receptor with primarily three stable structural conformations at equilibrium (e.g. a 'agonist-bound,' 'antagonist-bound,' and 'unbound'). The target protein-ligand complexes database 200 for training the SPS-DC should contain a diverse plurality of representations of target protein-ligand complexes in their respective agonist-bound conformations, a diverse plurality of representations of target protein-ligand complexes in their respective antagonist-bound conformations, and a diverse plurality of representations of target proteins in their respective unbound conformations. Furthermore, the database 200 should be sufficiently large and sufficiently diverse to encode a learnable representative pattern which the SPS-DC 310 can effectively learn.

After training, given as input a target protein structure representation previously unseen to the SPS-DC neural network, it outputs its classification prediction (i.e. agonist-bound conformation vs antagonist-bound conformation vs unbound conformation). In the example depicted in FIG. 3, the SPS-DC is a trinary classifier. However, the SPS-DC may be n-ary where n is simply the number of ligand effects classes of the particular application.

The exemplary illustration in FIG. 4 depicts a receptor protein structure representation 400 passed as input into an SPS-DC neural network 410 which classifies the input receptor protein structure as being in an antagonist-bound conformation 440. The discriminative feature maps 450 accompany the classification output.

FIG. 3 and FIG. 4 both depict an example whereby the SPS-DC neural network is a trinary classifier that has been trained such that given a target protein structure representation, it infers whether that input structure is of the agonist-bound class 420 vs antagonist-bound class 440 vs unbound class 430. Of note, the SPS-DC neural network may be trained instead to infer other properties from receptor protein structure. The property (or properties) which the SPS-DC is trained to evaluate depend on the objective. The training database simply needs to be representative of the property values, and must contain a sufficiently large and sufficiently representative diverse plurality of structural conformations across property values.

FIG. 5 depicts a preferred embodiment of a discriminative feature localization method of an SPS-DC neural network. In this example, the discriminative feature localization method is a Class Activation Mapping (CAM) and the SPS-DC has a Global Average Pooling (GAP) layer 530 for CAM. The feature extraction layers 510 act on an input target protein structure representation 500 to yield a set of feature maps 520. For each feature map, its values $f_k(\alpha_1, \ldots, \alpha_N)$ are globally averaged as shown in 530 to yield a single entry in the feature vector 540. Where $f_k(\alpha_1, \ldots, \alpha_N)$ is the kth feature map, $\alpha_p$ is the pth axis variable of the feature map's domain wherein the pth axis is of dimension dim($\alpha_p$). The total number of elements in each feature map is denoted Z and is given by, $$Z = \prod_{p=1}^{N} \dim(\alpha_p)$$

The feature vector 540 has as many entries as there are feature maps in the preceding layer 520. The feature vector is connected via a dense layer to the output scores as shown in 560. The dense layer 560 consists of weights 550 which multiply the feature vector entries yielding products which are summed to yield the respective output scores for the output classes: unbound conformation class 570, agonist-bound conformation class 580, and antagonist-bound conformation class 590. Furthermore, the layer 560 is 'dense' or 'fully connected' because there is one such weight 550 for each unique pairing of [feature vector entry, output class]. An activation function such as ReLU may be applied to the output scores, the higher of which is the output classification as illustrated in 570. It follows that since ReLU is monotonically increasing over the positive domain, the higher of the three outputs necessarily has the higher raw score computed via the formula in 560. One may factor in the weights $\omega_k$ as follows:

$$\sum_k \omega_k \left( \frac{1}{Z} \sum_{i=1}^{Z} f_k^{(i)}(\alpha_1, \ldots, \alpha_N) \right) = \frac{1}{Z} \sum_k \sum_{i=1}^{Z} \left( \omega_k f_k^{(i)}(\alpha_1, \ldots, \alpha_N) \right)$$

whereby $\omega_k f_k(\alpha_1, \ldots, \alpha_N)$ are weighted feature maps for which given a ReLU-like activation only the non-negative values contribute towards the classification and they do so proportionally, i.e. the higher the value of a point in the weighted feature map, the more it contributes towards the final output score of its associated class. This property is preserved through the global average pooling of the weighted feature maps. Summing over the k weights associated with a given class is equivalent to a discriminative map overlay.

FIG. 6 elucidates a class activation mapping mechanism embodiment of discriminative feature localization. The final layer weights—i.e. the weights by which the feature maps are scaled—are shown in 610, yielding the weighted feature maps 620. The weighted feature maps are then upsampled back to the size of the original input target protein structure representation data 630 and are all overlaid on the representation as shown in 650. The discriminative feature maps 640 are directly superimposed on the input data after upsampling.

FIG. 7 illustrates the amino acid embedding procedure. The initial encoding of the amino acid residues is a one-hot-encoding as illustrated in 700, 710, 720, and 730 wherein all but one entry of the vector are zeros and the non-zero entry is a 1 indicating the amino acid it encodes. The one-hot-encoding is sparse and does not convey any semantic meaning, serving instead only as a unique identifier of the respective amino acid.

In one embodiment of the invention, there are 20+n such one-hot-encoder vectors, where 20 are for the 20 amino acids in humans, and n is the number of auxiliary tokens such as <end-of-peptide> token 795.

Each of the one-hot-encoder vectors are used to right multiply a shared weight matrix 770, thereby effectively picking out the one column of the shared weight matrix that corresponds to the unique index or address of that amino acid. That unique column is the corresponding vector embedding of that amino acid, as illustrated in 740, 750, and 760, corresponding respectively to one-hot-encoder vectors 700, 710, and 720 respectively. As noted, since the vector embeddings are simply columns of the shared weight matrix 770, it follows that they are themselves the learnable weights of the residue embedding neural network.

The residue embedding neural network takes the pairwise dot product 780 of embeddings. Then for each amino acid residue, it applies a softmax activation 775 to convert the vector of dot products into a probability distribution. In one embodiment, the probability distribution is intended to indicate the probability that the subject amino acid is in close sequence proximity to the amino acid being evaluated. If they are typically in close proximity, then the dot product of their respective embedding vectors should be closer to 1, and if they are rarely in close sequence proximity, the dot product should be closer to zero. There are other methods for implementing the loss function 790 in this invention, sequence proximity being just a non-limiting example.

In one embodiment, a cross entropy loss 785 can then be used, wherein the target distribution is empirically determined by sequence proximity, i.e. $t_{km}$ is a distribution whose value is closer to 1 for amino acids m typically of close sequence proximity to amino acid k, and closer to zero for for amino acids m of far sequence proximity to amino acid k. The net loss 790 is the sum of the losses across all the amino acids. By way of example but not limitation, an optimization method such as stochastic gradient descent can then be used to train the network.

An exemplary embodiment of a Localized Structure Update Engine is depicted in FIG. 8. It involves as components, a localized structure update method 820 and a trained SPS-DC neural network 850. A target protein's structure representation SPS-DC-labeled as belonging to 'other conformation' 800 is passed in along with its discriminative feature maps 810 as input into the localized structure method 820. The localized structure method acts on the input to locally update only the aspects indicated by the discriminative feature maps. This results in an updated local segment 840. The updated target protein structure 830 is then passed as input into the SPS-DC 850. If the updated structure 830 is found to be of the 'conformation of interest' as desired, the engine exits and outputs the updated structure representation 870 along with a mask of the updated aspects 880. If however, the resulting class is still the 'other conformation' and the stopping criteria (e.g. max number of iterations) is not yet met, then the updated structural conformation representation 830 is passed as input into the localized structure update method 820. The process continues in a loop as described till exit condition 860 is met. When exit condition 860 is met, the engine exits and outputs the representation of the most updated structural conformation 870.

The localized structure update method 820 could be implemented in any number of ways including but not limited to genetic algorithms and their variants, particle swarm optimization methods and their variants, simulated annealing methods and their variants, stochastic gradient descent and its variants, and Monte Carlo Tree Search (MCTS) methods and their variants. The key principle is simply to progressively move the SPS-DC score towards the conformation of interest and away from the other conformation. The progression of the score change need not be monotonic, either, but simply needs to progress in an expectation sense. For instance, random walk with pull type schema may not progress monotonically, but in aggregate (i.e. in an expectation sense) they progress in the correct direction.

As noted, in some embodiments the Localized Structure Update Method could be a genetic algorithm whereby the SPS-DC evaluates and checkpoints the score following a certain number of iterations. A similar checkpointing forward-facing approach can be applied to particle swarms with the trained SPS-DC as value function. Additionally, as noted, stochastic gradient descent (SGD) may also be utilized. SGD is a well known and effective method for updating structural parameters based on a gradient of those parameters derived from a neural network.

FIG. 9 is an illustration of a transformer architecture-based SPS-DC neural network embodiment. As noted earlier, the SPS-DC neural network can take any number of forms including but not limited to graphical neural network, graphical convolution neural network, convolutional neural network, transformer architecture, etc. In this embodiment of a transformer SPS-DC, an encoder-decoder architecture is shown. The encoder part 900 accepts a structure input vector 905 into the structure embedding 915. The structure input vector is a vector of structure parameters. It is of fixed length, L, and zero padding is used for target proteins whose structure parameters are represented by a vector of smaller length and the fixed length, L. The fixed length, L, is a hyperparameter.

The structure embedding is a weight matrix, $W_s$, 915 which the structure input vector, x, 905 multiplies to yield the structure embedding vector, s, as follows:

$$W_s x = s$$

where is an m×L matrix, where L is the fixed length of the structure input vector and m is the length of the amino acid residue embedding vectors. Both m and L are hyperparameters of the model.

The amino acid residue inputs 910 can be in the form of one-hot-ecoder vectors which are passed into the residue embedding 920 described in FIG. 7. A position encoding 925 can be added to the output residue embedding vectors to imprint a signal of sequence position on the respective residue embeddings.

An array of vectors consisting of the structure embedding vector and each of the residue embedding vectors is passed as input into an attention layer 930. The attention layer consists of three types of weight matrices, a query weight matrix, $W_q$, a key weight matrix, $W_k$, and a value weight matrix, $W_v$. Each of the embedding vectors in the array are then multiplied by each of the three matrices to obtain respective queries, keys, and values, as follows:

$$W_q u = q$$

$$W_k u = k$$

$$W_v u = V$$

where u is an embedding vector (i.e. either the structure embedding vector s or one of the residue embedding vectors r).

For each embedding vector in the array, its respective query vector is dot produced with the key vectors of all tokens in the array. Here we use the terms 'token' and 'vector' interchangeably to denote members of the array. Next a softmax operation is done on the resulting array to yield a probability distribution for each token. Next, for each token, a linear combination of values v is taken wherein the coefficient of each value is the respective probability. The output of this linear combination is then taken as the token's respective output into the next layer of the transformer. This is done for each token, therefore the length and the input array and the length of the output array from this attention layer 930 are the same. Given the ith token, its corresponding coefficient associated with the jth token can be denoted $c_{ij}$ and is given by, $$c_{ij} = \frac{e^{\langle qi, kj \rangle}}{\sum_p e^{\langle qi, kp \rangle}}$$

The attention layer output of the ith token can be denoted $o_i$ and is then given by, $o_i \Sigma_j c_{ij} v_j$ In some embodiments the dot product $<q_i, k_j>$ can be scaled by a variance factor.

The array of outputs $o_i$ are then passed into a normalization layer 940. Furthermore, a copy of the input array which was passed into the attention layer is passed into 935 and added to the normalization layer, skipping the attention layer. This skip connection serves to preserve the pre-attention layer character signal thereby enhancing available signals for learning.

The output from the Add skip & norm layer 940 is passed into a feed forward neural network layer 945 and from there into another Add skip & norm layer 955. Also, in another skip connection 950, the output from the Add skip & norm layer 940 is passed directly into the next Add skip & norm layer 955. The block module 960 of "attention→add skip & norm→feed forward→Add skip & norm" is repeated N number of times where N is a hyperparameter of the model architecture.

The final output array of the encoder part is then passed 962 into the decoder part 964. In particular, it enters the decoder at a cross attention layer 974, wherein the encoder output array joins 972 the incoming token from the preceding layer 968 of the decoder. The subject token then attends to all elements in the combined array via the previously described attention mechanism, hence the term cross attention.

The decoder receives input both from the encoder via cross attention input 972 as well as directly via the structure vector input 905. It enters a self-attention layer 966 whose context consists of only one token, initially the structure embedding vector, which self-attends to itself; after which it is passed to add skip & norm layer 968 and then onwards to cross attention layer 974. Also, in a skip connection 970, the output from the structure embedding 915 is passed directly into the Add skip & norm layer 968. In another skip connection 978, the output from the Add skip & Norm layer 968 is passed directly into the Add skip & norm layer 976. The output from 976 is passed directly into a feedforward layer 980. Also, in another skip connection 984, the output from 976 is passed directly into the Add skip & norm layer 982.

The block module 986 repeats N times where N is a hyperparameter of the model.

The final output from the N repeated blocks 986 is passed into a linear layer 988 of length equal to the number of ligand effect classes. The linear layer can be connected to a discriminative feature localization mechanism. The output of the linear layer is then acted on by a softmax activation 990 to generate a probability distribution 992.

During training, in one embodiment, the probability distribution 992 can be compared against a target distribution of labels using a binary cross entropy loss function. Then an optimization method such as stochastic gradient descent, for example, can be used to train the model. During inference, given a target protein sequence and structure representation, the model outputs a probability distribution 992 predicting the ligand effect classification.

FIG. 10 is an illustrative example of a training architecture of a CAM-guided transformer expert for peptide ligand design given a target protein sequence and structure representation. The encoder part 900 is identical in form to the encoder part of the transformer-based SPS-DC neural network example described above in FIG. 9. The decoder part 1064 of FIG. 10, however, has a number of distinct aspects from the decoder part 964 of FIG. 9. Its direct input consists of both a structure input vector 905 as well as a residue input vector 1066 which enters sequentially in an autoregressive manner.

The training architecture is designed for parallelism. In particular, for each amino acid residue token in a peptide ligand sequence to be generated, the preceding amino acid residues of the ligand as well as the label (i.e. the correct amino acid residue token) are both known and available for end-to-end differentiable supervised learning. Hence the prediction of each amino acid residue token can be run simultaneously with the shared weights of the architecture being updated simultaneously. The implementation of this is reflected in the masked attention layer 1070, wherein for any given residue in the ligand sequence, the preceding tokens of the ligand are visible to the prediction algorithm and used in attention layer, but its residue answer label (i.e. the correct next amino acid in the sequence) is masked from the prediction algorithm.

End-to-end stochastic gradient descent, for example (or other optimization), then proceeds in parallel for each amino acid, wherein each parallel process updates the set of shared weights as it proceeds. This however, is simply an implementation embodiment example, and not a limitation in any way.

In the embodiment of FIG. 10, the <start-of-sequence> token is taken as the structure input vector 905. Subsequent tokens are the amino acid residues and are passing in from the final output layer in an autoregressive manner. As noted however, since both the preceding residues of the ligand and the residue answer labels are fully known during training, the architecture is such that training can be done in parallel i.e. without needing to wait in sequence.

The residue embedding 920 is as described earlier in FIG. 7.

The array of embedding vectors 1068 comes from the structure input 905 in the initial iteration (or thread), and from both the structure input 905 and the sequential residue outputs 1066 in subsequent iterations (or threads). After respective embeddings 915 and 920, the array of embedding vectors 1068 is passed as input into the masked attention layer 1070 in parallel fashion as described. Also, via the skip connection 1072, the array of embedding vectors 1068 is passed directly into the Add skip and Norm layer 968.

Other than the form of the inputs (structure 905 and sequential residue 1066) and the masked attention layer 1070 which encodes the parallelism of the transformer training architecture, the transformer decoder block 1088 of FIG. 10 is otherwise identical to the transformer decoder block 986 of FIG. 9. In particular, the transformer block 1088 repeats N times, where N is a hyperparameter of the model. Afterwards, the output is passed into a linear layer 988 to whose output a softmax operation 990 is performed, yielding an output probability distribution 1094.

The final layer output probabilities 1094 are over the amino acids and auxiliary tokens such as an <end-of-sequence> token. By way of example but not limitation, a cross-entropy loss function can be implemented and then stochastic gradient descent (or other optimization) used to optimize the model.

FIG. 11 is an illustrative example of an inference architecture of a CAM-guided transformer expert for peptide ligand design given target protein sequence and structure. While FIG. 10 illustrates the training architecture, FIG. 11 illustrates the inference architecture.

One difference between the training architecture (FIG. 10) and the inference architecture (FIG. 11) is that the training architecture includes trainable weights while in the inference architecture all weights are frozen. Analogous parts are labeled with same reference character but with the inference (frozen weights) version appended with a 'b', for example 915 (in FIG. 10) denotes a structure embedding with trainable weights while 915b (in FIG. 11) denotes the same structure embedding, but already fully trained and with frozen weights.

Also, unlike for the training architecture (FIG. 10), for the inference architecture (FIG. 11) there is no training and therefore no associated loss function computation and no stochastic gradient descent or other training optimization procedure. Instead, the final layer output probabilities 1094 are sampled at each iteration of the autoregression, thereby generating the output protein sequence. As with the training architecture, the final layer output probabilities 1094 of the inference architecture are over the amino acids and auxiliary tokens such as an <end-of-sequence> token.

Furthermore, the primary difference between the training architecture (FIG. 10) and the inference architecture (FIG. 11) is that during training both the preceding residues of the ligand and the subject residue answer label are known, while during inference only the preceding ligand residues are known, the residue answer label is not known. In both instances, training and inference, the target protein sequence and structure are known.

Therefore, for the inference architecture, the initial attention layer 966b of the decoder 1132 is not a masked attention layer as it was in the case of the training architecture. Furthermore, an autoregressive process is needed because the output token of iteration t is the residue input token for iteration t+1. Furthermore, the <start-of-sequence> token (i.e. at iteration t=0 1136) is the embedding of the refined structure input vector 1106. For subsequent iterations (i.e. t>0) 1138, the embedding of the amino acid token output from the prior iteration is concatenated into the array 1068 and passed as input into the attention layer 966b. The decoder block 1160 is repeated N times where N is a hyperparameter of the system.

Another critical distinction (between training and inference) in one embodiment is that in the inference architecture, the structure input 905 is first passed into the CAM-guided localized structure refinement engine 1104, for refinement towards the desired ligand effect classification, i.e. towards the expertise of the transformer. The CAM-guided localized structure refinement engine 1104, was earlier described in FIG. 8. Given a structure input vector 905, it is passed through the respective layers of the CAM-guided transformer expert, ultimately yielding an amino acid residue, the first in the ligand sequence. This residue is then passed in as input 1134, passes through the indicated layers, and yields the second amino acid residue, and so on till an <end-of-peptide> token is reached, at which point the process halts and the generated ligand peptide sequence is returned.

FIG. 12 is an illustrative example of a training architecture of a CAM-guided transformer expert for small molecule drug ligand design given target protein sequence and structure. In this case the ligand sequence is of length 1, so there is only need for a <start-of-sequence> token which here again is the structure input vector 905. Unlike in the case of peptide ligand FIG. 10, there is no ligand residue input since the sequence here is of length 1. For the same reason, the initial attention layer 966 is not masked. The final output probability distribution 1292 is over a library of Small Molecule Drug (SMD) ligand candidates. All other aspects of the training architecture are the same as for the peptide ligand design instance, FIG. 10.

Furthermore, the encoder part 900 of FIG. 12 is identical to the encoder part 900 of FIG. 9; while the decoder part 1264 of FIG. 12 is similar to the decoder part 964 of FIG. 9 in that they only differ in their output probability distribution. The other aspects of the architecture of FIG. 12 are as described for the transformer architecture-based SPS-DC neural network embodiment (FIG. 9).

FIG. 13 is an illustrative example of an inference architecture of a CAM-guided transformer expert for small molecule drug ligand design given target protein sequence and structure. The inference architecture, FIG. 13, differs from its corresponding training architecture, FIG. 12, in that the structure input vector 905 is first passed into a CAM-guided localized structure refinement engine 1104, for refinement towards the desired ligand effect classification, i.e. towards the expertise of the transformer. The CAM-guided localized structure refinement engine 1104, was earlier described in FIG. 8. The resulting refined structure input 1106 is what is then passed into the structure embedding module 915b. As input, the architecture accepts the structure 905 and sequence 910 of a target protein and returns a probability distribution 1360 over candidate small molecule drug ligands.

The encoder part 1100 of FIG. 13 is identical to the encoder part 1100 of FIG. 11. As for the decoder part 1332, it differs from the decoder part 1132 of FIG. 11 in that the direct inputs into the small molecule drug decoder is only the structure input 1106; there is no autoregressive sequence input since the small molecule drug is taken as having a sequence of length 1. The transformer decoder block 1354 repeats N times where N is a hyperparameter of the system.

The structure embedding output vector 1334 is passed as input into the first attention layer 966b. Also, 1334 is passed directly, via skip connection 1336, into the Add skip & norm layer 968b. The model returns a probability distribution 1360 over candidate small molecule drug ligands; and the output distribution is sampled to obtain a candidate small molecule drug ligand.

FIG. 14 is a flow schematic of steps to an embodiment of a CAM-guided structure refinement engine. In this embodiment, data from a signaling pathway specific database of receptor-ligand complexes 1400 is transmitted 1405 to a signaling pathway specific discriminative classifier (SPS-DC) neural network training engine 1410. The SPS-DC neural network training engine uses the data to train an SPS-DC neural network. The trained SPS-DC neural network is then passed 1415 to a CAM-guided structure refinement engine 1420. In turn, the CAM-guided structure refinement engine 1420 uses the trained SPS-DC neural network 1410 as a main component.

FIG. 15 is a flow schematic of steps to an embodiment of a CAM-guided expert transformer inference engine. In this embodiment, the target protein is a receptor. The database of signaling pathway specific receptor-ligand complexes 1500 is further segmented 1505 by ligand effect class to get a segmented database 1510. This in turn is passed as input 1520 for use by the expert transformer training engine 1530. In addition, the trained amino acid residue embedding 1515 is also passed as input 1525 for use by the expert transformer training engine 1530. The expert transformer training engine 1530 is passed as input 1540 into the CAM-guided expert transformer inference engine 1550. Also, the CAM-guided structure refinement engine 1535 is passed as input 1545 into the CAM-guided expert transformer inference engine 1550. The CAM-guided structure refinement engine described in FIG. 8, is a component of the CAM-guided expert transformer inference engine 1550. The CAM-guided expert transformer inference engine takes as input a target protein structure and sequence, and also takes the desired ligand effect class (e.g. agonist, antagonist, etc), and yields as output the ligand sequence.

Ones with ordinary skill in the art will recognize that the invention disclosed herein can be implemented over an arbitrary range of computing configurations. We will refer to any instantiation of these computing configurations as the computing environment. An illustrative example of a computing environment is depicted in The Computing Environment FIG. Examples of computing environments include but are not limited to desktop computers, laptop computers, tablet personal computers, mainframes, mobile smart phones, smart television, programmable hand-held devices and consumer products, distributed computing infrastructures over a network, cloud computing environments, or any assembly of computing components such as memory and processing—for example.

As illustrated in The Computing Environment FIG, the invention disclosed herein can be implemented over a system that contains a device or unit for processing the instructions of the invention. This processing unit 16000 can be a single core central processing unit (CPU), multiple core CPU, graphics processing unit (GPU), multiplexed or multiply-connected GPU system, or any other homogeneous or heterogeneous distributed network of processors.

In some embodiment of the invention disclosed herein, the computing environment can contain a memory mechanism to store computer-readable media. By way of example and not limitation, this can include removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer.

The computing environment can include a system board 16070.

As depicted in The Computing Environment FIG, the computing environment can include a system memory 16030 which can be volatile memory such as random access memory (RAM) and may also include non-volatile memory such as read-only memory (ROM). Additionally, there typically is some mass storage device 16040 associated with the computing environment, which can take the form of hard disc drive (HDD), solid state drive, or CD, CD-ROM, blu-ray disc or other optical media storage device. In some other embodiments of the invention the system can be connected to remote data 16240. Furthermore, the remote data store 16240 can consist of multiple parts connected to each other via an interface 16250.

The computer readable content stored on the various memory devices can include an operating system, computer codes, and other applications 16050, which can be connected via an interface 16080 to memory 16020. By way of example not limitation, the operating system can be any number of proprietary software such as Microsoft windows, Android, Macintosh operating system, iphone operating system (iOS), or Linux commercial distributions. It can also be open source software such as Linux versions e.g. Ubuntu. In other embodiments of the invention, data processing software and connection instructions to a sensor device 16060 can also be stored on the memory mechanism. The procedural algorithm set forth in the disclosure herein can be stored on—but not limited to—any of the aforementioned memory mechanisms. In particular, computer readable instructions for training and subsequent image classification tasks can be stored on the memory mechanism.

The computing environment typically includes a system bus 16010 through which the various computing components are connected and communicate with each other. The system bus 16010 can consist of a memory bus, an address bus, and a control bus. Furthermore, it can be implemented via a number of architectures including but not limited to Industry Standard Architecture (ISA) bus, Extended ISA (EISA) bus, Universal Serial Bus (USB), microchannel bus, peripheral component interconnect (PCI) bus, PCI-Express bus, Video Electronics Standard Association (VESA) local bus, Small Computer System Interface (SCSI) bus, and Accelerated Graphics Port (AGP) bus. The bus system can take the form of wired or wireless channels, and all components of the computer can be located remote from each other and connected via the bus system. By way of example and not of limitation, the processing unit 16000, memory 16020, input devices 16120, output devices 16150 can all be connected via the bus system. In the representation depicted in The Computing Environment FIG, by way of example not limitation, the processing unit 16000 can be connected to the main system bus 16010 via a bus route connection 16100; the memory 16020 can be connected via a bus route 16110; the output adapter 16170 can be connected via a bus route 16180; the input adapter 16140 can be connected via a bus route 16190; the network adapter 16260 can be connected via a bus route 16200; the remote data store 16240 can be connected via a bus route 16230; and the cloud infrastructure can be connected to the main system bus vis a bus route 16220.

In some embodiment of the invention disclosed herein, The Computing Environment FIG illustrates that instructions and commands can be input by the user using any number of input devices 16120. The input device 16120 can be connected to an input adapter 16140 via an interface 16130 and/or via coupling to a tributary of the bus system 16010. Examples of input devices 16120 include but are by no means limited to keyboards, mouse devices, stylus pens, touchscreen mechanisms and other tactile systems, microphones, joysticks, infrared (IR) remote control systems, optical perception systems, body suits and other motion detectors. In addition to the bus system 16010, examples of interfaces through which the input device 16120 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein, The Computing Environment FIG illustrates that output data, instructions, and other media can be output via any number of output devices 16150. The output device 16150 can be connected to an output adapter 16170 via an interface 16160 and/or via coupling to a tributary of the bus system 16010. Examples of output devices 16150 include but are by no means limited to computer monitors, printers, speakers, vibration systems, and direct write of computer-readable instructions to memory devices and mechanisms. Such memory devices and mechanisms can include by way of example and not limitation, removable or non-removable media, volatile or non-volatile media. By way of example and not limitation, removable media can be in the form of flash memory card, USB drives, compact discs (CD), blu-ray discs, digital versatile disc (DVD) or other removable optical storage forms, floppy discs, magnetic tapes, magnetic cassettes, and external hard disc drives. By way of example but not limitation, non-removable media can be in the form of magnetic drives, random access memory (RAM), read-only memory (ROM) and any other memory media fixed to the computer. In addition to the bus system 16010, examples of interfaces through which the output device 16150 can be connected include but are by no means limited to USB ports, IR interface, IEEE 802.15.1 short wavelength UHF radio wave system (bluetooth), parallel ports, game ports, and IEEE 1394 serial ports such as FireWire, i.LINK, and Lynx.

In some embodiment of the invention disclosed herein some of the computing components can be located remotely and connected to via a wired or wireless network. By way of example and not limitation, The Computing Environment FIG shows a cloud 16210 and a remote data source 16240 connected to the main system bus 16010 via bus routes 16220 and 16230 respectively. The cloud computing infrastructure 16210 can itself contain any number of computing components or a complete computing environment in the form of a virtual machine (VM). The remote data source 16240 can be connected via a network to any number of external sources such as NMR spectrometry devices, X-ray diffraction devices, electron microscopes, imaging devices, imaging systems, or imaging software.

In some embodiment of the invention disclosed herein, a sensor system 16060 which captures and pre-processes data is attached directly to the system. For example, this may be an electron microscope (and associated image processing software); it may be a camera in the case of an imaging system, say for processing distance map photographs; or it may be an X-ray crystallography machine or an NMR spectrometer (and associated software), excetera. Stored in the memory mechanism—16020, 16240, or 16210—are machine learning models, algorithms, and data products developed according to the procedures set-forth herein. Computer-readable instructions are also stored in the memory mechanism, so that upon command, protein structure representation data, its substrates and associated data can be captured or can be received over a network from a remote or local previously collated database. This transmission of data can be done over a wired or wireless network as previously detailed, as the source and/or recipient of the data output can be at a remote location.

The objects set forth in the preceding are presented in an illustrative manner for reason of efficiency. It is hereby noted that the above disclosed methods and systems can be implemented in manners such that modifications are made to the particular illustration presented above, while yet the spirit and scope of the invention is retained. The interpretation of the above disclosure is to contain such modifications, and is not to be limited to the particular illustrative examples and associated drawings set-forth herein.

Furthermore, by intention, the following claims encompass all of the general and specific attributes of the invention described herein; and encompass all possible expressions of the scope of the invention, which can be interpreted—as pertaining to language—as falling between the aforementioned general and specific ends.

What is claimed:

1. A method, comprising:
   a) receiving, at a processor, representations of a plurality of target protein-ligand complexes;
   b) training a neural network to classify the plurality of target proteins:
      i) wherein the neural network is equipped with a discriminative feature localization mechanism,
      iii) wherein the classification is done according to a specified ligand effect category,
      iv) wherein the ligand effect category is represented by a specified partitioning of the plurality of representations of the target protein-ligand complexes,
      v) wherein each partition in the partitioning represents an output class of the neural network,
      vi) wherein the neural network is configured to accept the target protein's sequence and structure representation as input, and return the associated ligand's effect classification as output,
      vii) wherein the neural network output also includes a discriminative feature localization map;
   c) receiving, at a processor, a set of initial values of a plurality of structure parameters specifying the target protein's conformational structure;
   d) using, via the processor, the trained neural network to perform inference on the initial values of the protein's conformational structure representation:
      i) wherein the neural network outputs both the ligand effect classification and the discriminative feature map,
      ii) wherein the discriminative feature localization map specifies values of a localized subset of the structure parameters of the target protein;
   e) receiving, at a processor, a local structure update method, which is a set of instructions to update the values of the localized subset of structure parameters specified by the discriminative feature map:
      i) wherein the local structure update method consists of a plurality of iterative steps, and some termination criteria,
      ii) wherein the output of each iterative update step—an updated conformational structure representation—is evaluated by the neural network, yielding an updated classification score and an updated discriminative feature map,
      iii) wherein:
         (1) if termination criteria are not yet met, then the updated conformational structure representation and the updated discriminative feature map are both re-entered as input into the local update method, else
         (2) if termination criteria are met, then the local structure update iteration terminates, and the updated conformational structure representation and the updated discriminative feature map are both returned as output;
   f) selecting from the representations of a plurality of target protein-ligand complexes, a subset of complexes with a specific ligand effect category;
   g) using the selected specific subset of complexes to train an expert neural network:
      i) wherein the expert neural network is configured to accept the target protein's sequence and structure representation as input, and return an associated candidate ligand's sequence as output,
      ii) wherein the expertise of the neural network is the specific ligand effect category of its training dataset,
      iii) wherein at inference, the local structure update method is first used to update the input structure representation of the target protein towards the expertise category of the expert neural network, iv) wherein at inference, the expert neural network's action is on the updated structure representation of the target protein returned by the local structure update method;

h) using the trained expert neural network to generate a candidate peptide ligand's sequence as output, given a target protein's sequence and structure representation as input, i) synthesizing the peptide ligand, and j) testing the biological activity of the synthesized peptide ligand in vitro and in vivo.

2. The method of claim 1, wherein the expert neural network is a transformer.

3. The method of claim 1, wherein the discriminative feature localization mechanism is a class activation map.

4. The method of claim 2, wherein the transformer architecture is of encoder-decoder type.

5. The method of claim 4, wherein the structure representation is acted on by a structure embedding whose weights are a subset of the learnable parameters of the transformer.

6. The method of claim 5, wherein the start-of-sequence vector of the decoder is the target protein's structure embedding vector.

7. The method of claim 6, wherein an input array of vectors into the encoder part of the transformer includes the structure embedding vector of the target protein, and each amino acid embedding vector, one per amino acid in the target protein sequence.

8. The method of claim 7, wherein the ligand is a peptide ligand.

9. The method of claim 8, wherein the final layer of the transformer architecture is a softmax activation, wherein the final layer output is a probability distribution over the amino acids and an end-of-peptide token.

10. The method of claim 9, for using a transformer to generate the sequence of a candidate peptide ligand given a target protein representation, the method further comprising: using an autoregressive process to generate the sequence.

11. The method of claim 10, wherein the target protein is a receptor.

12. A method, as in the method of claim 11, for obtaining the sequence of a candidate peptide ligand of a specified effect category, given a target receptor sequence and structure, wherein the method is also for obtaining an effective peptide ligand, the method further comprising:
a) randomly sampling the output probability distribution to select an amino acid residue for each respective position in the ligand sequence during autoregression;
b) stopping the autoregression iteration upon sampling the end-of-peptide token;
c) obtaining the resulting sequence of amino acids yielded by the autoregression process, and storing it in memory as a candidate peptide ligand;
d) repeating the above process a plurality of times, each yielding a candidate peptide ligand;
e) assessing an efficacy and interaction of each candidate peptide ligand with the target receptor, wherein the efficacy assessment involves predicting one or more of:
i) the binding partners of the protein-ligand complex, and
ii) the binding affinity of the ligand to the target receptor;
f) selecting the most effective peptide ligand from the plurality of candidate peptide ligands.

13. A method, comprising:
a) receiving, at a processor, representations of a plurality of target protein-ligand complexes, wherein the ligands are small molecule drug ligands;
b) training a neural network to classify the plurality of target proteins:
i) wherein the neural network is equipped with a discriminative feature localization mechanism,
ii) wherein the classification is done according to a specified ligand effect category,
iii) wherein the ligand effect category is represented by a specified partitioning of the plurality of representations of the target protein-ligand complexes,
iv) wherein each partition in the partitioning represents an output class of the neural network,
v) wherein the neural network is configured to accept the target protein's sequence and structure representation as input, and return the associated ligand's effect classification as output,
vi) wherein the neural network output also includes a discriminative feature localization map;
c) receiving, at a processor, a set of initial values of a plurality of structure parameters specifying the target protein's conformational structure;
d) using, via the processor, the trained neural network to perform inference on the initial values of the protein's conformational structure representation:
i) wherein the neural network outputs both the ligand effect classification and the discriminative feature map,
ii) wherein the discriminative feature localization map specifies the-values of a localized subset of the structure parameters of the target protein;
e) receiving, at a processor, a local structure update method, which is a set of instructions to update the values of the localized subset of structure parameters specified by the discriminative feature map:
i) wherein the local structure update method consists of a plurality of iterative steps, and some termination criteria,
ii) wherein the output of each iterative update step—an updated conformational structure representation—is evaluated by the neural network, yielding an updated classification score and an updated discriminative feature map,
iii) wherein:
(1) if termination criteria are not yet met, then the updated conformational structure representation and the updated discriminative feature map are both re-entered as input into the local update method, else
(2) if termination criteria are met, then the local structure update iteration terminates, and the updated conformational structure representation and the updated discriminative feature map are both returned as output;
f) selecting from the representations of a plurality of target protein-ligand complexes, a subset of complexes with a specific ligand effect category;
g) using the selected specific subset of complexes to train an expert neural network:
i) wherein the expert neural network is configured to accept the target protein's sequence and structure representation as input, and return an associated candidate ligand's sequence as output,
ii) wherein the sequence length of the associated candidate ligand, a small molecule drug, is taken as 1, iii) wherein the expertise of the neural network is the specific ligand effect category of its training dataset,
iv) wherein at inference, the local structure update method is first used to update the input structure representation of the target protein towards the expertise category of the expert neural network,
v) wherein at inference, the expert neural network's action is on the updated structure representation of the target protein returned by the local structure update method;
h) using the trained expert neural network to generate a candidate peptide ligand's sequence as output, given a target protein's sequence and structure representation as input.

14. The method of claim 13, wherein the expert neural network is a transformer, wherein the final layer of the transformer architecture is a softmax activation, wherein the final layer output is a probability distribution over a diverse plurality of small molecule drug ligands.

15. A method, as in the method of claim 14, for obtaining a candidate small molecule drug ligand representation of a specified effect category, given a target protein sequence and structure, wherein the method is also for obtaining an effective small molecule drug ligand representation and for manufacturing the ligand, the method further comprising:

a) randomly sampling the output probability distribution to select a small molecule drug ligand representation;
b) storing the small molecule drug ligand representation in memory as a candidate small molecule drug ligand representation;
c) repeating the above process a plurality of times, each yielding a candidate small molecule drug ligand representation;
d) the assessing an efficacy and interaction of each candidate small molecule drug ligand representation with the target protein representation, wherein the efficacy assessment involves predicting one or more of:
    i) the binding partners of the protein-ligand complex, and
    ii) the binding affinity of the ligand to the target receptor;
e) selecting the most effective small molecule drug ligand representation from the plurality of candidate small molecule drug ligand representations;
f) manufacturing the selected small molecule drug ligand
g) testing the biological activity of the manufactured small drug ligand in vitro and in vivo.

* * * * *